(12) United States Patent
Adelman et al.

(10) Patent No.: US 8,103,761 B2
(45) Date of Patent: *Jan. 24, 2012

(54) METHODS OF ISSUING A CREDIT FOR A CERTIFICATE FOR A DOMAIN NAME

(75) Inventors: Warren Adelman, Scottsdale, AZ (US); Wayne Thayer, Phoenix, AZ (US)

(73) Assignee: Go Daddy Holding Company, LLC, Scottsdale, AZ (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/376,457

(22) Filed: Mar. 15, 2006

(65) Prior Publication Data

US 2006/0161644 A1 Jul. 20, 2006

Related U.S. Application Data

(63) Continuation-in-part of application No. 11/330,772, filed on Jan. 11, 2006, and a continuation-in-part of application No. 10/877,613, filed on Jun. 25, 2004, and a continuation-in-part of application No. 10/877,609, filed on Jun. 25, 2004.

(51) Int. Cl.
*G06F 15/16* (2006.01)
(52) U.S. Cl. ......... 709/224; 709/222; 709/227; 713/150
(58) Field of Classification Search .................. 709/224, 709/225, 228, 245; 713/150, 156, 201
See application file for complete search history.

(56) References Cited

U.S. PATENT DOCUMENTS

| | | | |
|---|---|---|---|
| 5,905,862 A | 5/1999 | Hoekstra | |
| 5,983,351 A | 11/1999 | Glogau | |
| 6,298,341 B1 | 10/2001 | Mann et al. | |
| 6,308,277 B1 | 10/2001 | Vaeth et al. | |
| 6,519,589 B2 | 2/2003 | Mann et al. | |
| 6,560,634 B1 | 5/2003 | Broadhurst | |
| 6,745,248 B1 | 6/2004 | Gardos et al. | |
| 6,789,103 B1 | 9/2004 | Kim et al. | |
| 6,880,007 B1 | 4/2005 | Gardos et al. | |
| 6,895,430 B1 | 5/2005 | Schneider | |
| 7,003,661 B2 | 2/2006 | Beattie et al. | |
| 7,114,177 B2 | 9/2006 | Rosenberg et al. | |
| 7,231,659 B2 * | 6/2007 | Trilli et al. | 726/3 |
| 7,899,187 B2 * | 3/2011 | Messerges et al. | 380/279 |
| 2002/0010795 A1 * | 1/2002 | Brown | 709/245 |

(Continued)

OTHER PUBLICATIONS

Jan. 6, 2010 Office Action in related U.S. Appl. No. 11/330,772.

(Continued)

*Primary Examiner* — Khanh Dinh

(74) *Attorney, Agent, or Firm* — Stewart J. Womack; Chris A. Watt

(57) ABSTRACT

The invention provides methods for efficiently registering a domain name and issuing a certificate without a Subscriber submitting a separate request for the certificate. A notice may be provided to the Subscriber after requesting to register the domain name that a credit for a certificate may be issued for the domain name. In other embodiments a credit may be given to the Subscriber for the certificate without receiving a separate request for the credit or certificate. The credit may be saved in a Subscriber's account to enable the Subscriber to use a certificate at a later time. In yet other embodiments, a single vetting process may be used to facilitate one or more of: creating a Subscriber's account; registering a domain name; and issuing a certificate.

22 Claims, 16 Drawing Sheets

U.S. PATENT DOCUMENTS

| | | | |
|---|---|---|---|
| 2002/0035611 A1 | 3/2002 | Dooley | |
| 2002/0065903 A1 | 5/2002 | Fellman | |
| 2002/0091827 A1 | 7/2002 | King et al. | |
| 2002/0129013 A1 | 9/2002 | Thomas | |
| 2002/0169842 A1 | 11/2002 | Christensen et al. | |
| 2003/0028762 A1* | 2/2003 | Trilli et al. | 713/153 |
| 2003/0182573 A1* | 9/2003 | Toneguzzo et al. | 713/201 |
| 2004/0039906 A1* | 2/2004 | Oka et al. | 713/156 |
| 2004/0044791 A1 | 3/2004 | Pouzzner | |
| 2004/0068460 A1 | 4/2004 | Feeley et al. | |
| 2004/0167982 A1 | 8/2004 | Cohen et al. | |
| 2004/0220903 A1* | 11/2004 | Shah et al. | 707/3 |
| 2004/0250075 A1 | 12/2004 | Anthe et al. | |
| 2005/0102354 A1 | 5/2005 | Hollenbeck et al. | |
| 2005/0239447 A1* | 10/2005 | Holzman et al. | 455/414.3 |
| 2006/0143442 A1* | 6/2006 | Smith | 713/156 |
| 2006/0161644 A1 | 7/2006 | Adelman et al. | |

OTHER PUBLICATIONS

Jun. 2, 2010 Reply to Jan. 6, 2010 Office Action in related U.S. Appl. No. 11/330,772.
Jan. 6, 2010 Office Action in related U.S. Appl. No. 11/375,751.
Jun. 8, 2010 Reply to Jan. 6, 2010 Office Action in related U.S. Appl. No. 11/375,751.
Mar. 22, 2011 Office Action in related U.S. Appl. No. 11/375,751.
Jun. 16, 2011 Reply to Mar. 22, 2011 Office Action in related U.S. Appl. No. 11/375,751.
Mar. 11, 2011 Office Action in related U.S. Appl. No. 11/330,772.
Jun. 7, 2011 Appeal Brief filed in response to Mar. 11, 2011 Office Action in related U.S. Appl No. 11/330,772.
Sep. 2, 2010 Office Action in related U.S. Appl. No. 11/375,751.
Oct. 1, 2010 Reply to Sep. 2, 2010 Office Action in related U.S. Appl. No. 11/375,751.
Aug. 5, 2010 Office Action in related U.S. Appl. No. 11/330,772.
Sep. 29, 2010 Reply to Aug. 5, 2010 Office Action in related U.S. Appl. No. 11/330,772.

* cited by examiner

METHODS OF ISSUING A CREDIT FOR A CERTIFICATE FOR A DOMAIN NAME

CROSS REFERENCE TO RELATED PATENT APPLICATION

This patent application is related to U.S. patent application Ser. No. 11/375,751, "IMPROVED METHODS OF ISSUING A CERTIFICATE FOR A DOMAIN NAME" concurrently filed herewith and also assigned to The Go Daddy Group, Inc.

This patent application is a continuation-in-part of U.S. patent application Ser. No. 11/330,772, filed on Jan. 11, 2006. U.S. patent application Ser. No. 11/330,772 is a continuation-in-part of U.S. patent application Ser. No. 10/877,613, filed on Jun. 25, 2004 and a continuation-in-part of U.S. patent application Ser. No. 10/877,609, filed on Jun. 25, 2004. All prior applications are incorporated herein in their entirety by this reference.

The subject matter of all listed patent applications is commonly owned and assigned to The Go Daddy Group, Inc.

FIELD OF THE INVENTION

The present invention relates to methods for efficiently providing certificates, such as a Secure Socket Layer (SSL) certificate, after registering a domain name.

BACKGROUND OF THE INVENTION

The Internet is a global network of interconnected computers that allows individuals and organizations around the world to communicate and to share information with one another. The World Wide Web (WWW), also known as the Web, is a collection of information resources contained in documents located on individual computers around the world and is one of the fastest growing parts of the Internet. Prevalent on the Web are multimedia Web sites offering and selling goods and services to individuals and organizations, i.e. Customers. Web sites may consist of a single Web page, but typically consist of multiple interconnected and related Web pages.

Each computer or server on the Internet is assigned a unique identifier known as an Internet Protocol (IP) address. A computer or server may host one or more Web sites. IP addresses are difficult to remember so a domain name service (DNS) associates Web sites' IP addresses with their corresponding domain names. This permits a Customer to enter an easily remembered domain name into a browser, and the browser, via the DNS, locates the unique IP address and thus the location of the Web site. Another advantage of the DNS is that the Web site may move its physical location on the Internet, i.e. receive a new IP address, but by making the appropriate changes in the DNS, the Web site may still be located using the original domain name.

In certain situations, the registrant of a domain name may not want to have their personal contact information made publicly available to prevent spam, identity theft, harassment, etc. from occurring. A proxy domain name registration permits a registrant to register a domain name anonymously by requesting the proxy to use the proxy's contact information so that the contact information published in the WHOIS database (a publicly accessible database of domain names and their corresponding registrants) is that of the proxy entity.

Internet businesses, whether a large corporation or an individual, are rapidly creating Web sites to take advantage of the growing number of Customers using the Internet and Customers' increasing willingness to purchase goods and services over the Web. Web sites created by Internet businesses may be reached by millions of Internet savvy Customers, thereby allowing Internet businesses to offer their products and services to a very large pool of potential Customers.

Some Internet businesses, typically larger more sophisticated ones, may provide their own hardware, software and connections to the Internet. However, many Internet businesses either do not have the resources available or do not want to create and maintain the infrastructure necessary to host their own Web sites. To assist these Internet businesses in operating their Web sites, many companies are offering hosting services for Web sites. These hosting companies typically provide the hardware, software and electronic communication means necessary to connect multiple Internet businesses' Web sites to the Internet. A single hosting company may literally host thousands of Web sites.

An unfortunate consequence of the Internet's growth is the accompanying growth of fraud on the Internet. Fraud not only results in actual losses, but it hinders the growth of the Internet. Many potential Customers may avoid conducting business over the Internet due to their fear of being deceived or of compromising personal data.

There are many fraudulent schemes, but two types of fraud tend to be particularly worrisome for Customers. The first type of fraud involves the operator of a Web site hiding or obscuring their identity from their Customers. Basically, the operator of a Web site takes advantage of the anonymity provided by the Internet thereby making it difficult for Customers to locate and punish a fraudulent Web site operator. For example, a Web site may purport to be from a known and trusted business when the Web site is in fact operated by an unscrupulous individual. The unscrupulous individual may try to receive credit card numbers or pass off goods and services under another's trademark as part of their fraudulent scheme.

The unscrupulous individual may have inserted false information in the WHOIS database when they registered their domain name to hide their identity. This is possible because Registrars do not verify the identity of a domain name registrant at the time domain names are registered. The unscrupulous individual may also try to use a proxy domain name registration. While most proxy domain name registrations are used for legitimate purposes, unscrupulous individuals may try to use this approach to make it more difficult for Customers to learn their identity, because the proxy's contact information, and not the unscrupulous individual's contact information, is made publicly available in the WHOIS database. As a consequence, legitimate businesses that wish to use a proxy domain name registration have a particularly urgent need for assuring their Customers that their identities are known and have been verified.

The second type of fraud involves individuals intercepting confidential information, such as credit card numbers, transmitted over the Internet between a Customer and a legitimate Web site. This type of fraud is much less common and may easily be prevented by transmitting confidential information only in a sufficiently strong encrypted format.

A common method for Internet businesses to protect their Customers from these two types of fraud is to obtain a secure certificate, such as a Secure Sockets Layer (SSL) certificate, for their Web sites. A secure certificate on a Web site lets Customers know that the owner of the Web site has been verified by a trusted third party (Certificate Authority or CA) and that confidential communications with the Web site are encrypted. SSL is a protocol for transmitting private documents via the Internet. SSL protects confidential information by using a private key to encrypt data transferred over an SSL connection. Common conventional browsers, such as NETSCAPE NAVIGATOR and INTERNET EXPLORER, support the SSL protocol, and many Web sites use the protocol to obtain confidential user information from their Customers. By convention, Uniform Resource Locators (URLs) that require an SSL connection start with "https:" instead of "http:".

When connecting to a Web site using the SSL protocol, the Customer's browser receives information regarding the CA that issued the Web site's SSL certificate. The browser may decide whether or not to trust the Web site's SSL certificate based on which CA issued the Web site's SSL certificate. If the CA is on the browser's list of trusted CAs, the browser will know that the owner of the Web site has met the trusted CA's process for receiving an SSL certificate.

A conventional process for a CA to issue an SSL certificate to a requesting Subscriber for the Subscriber's Web site is illustrated in FIGS. 1 and 2. The process starts with a Subscriber 150, typically the owner or an agent for the Web site 180, requesting hosting services from a Hosting Provider 160, typically in cooperation with an Internet Service Provider (ISP) (Step 200). The Hosting Provider 160 will typically provide the hardware and software necessary to place the Subscriber's Web Site 180 on the Internet. The Subscriber 150 may decide to request SSL services for its Web Site 180 from the Hosting Provider 160 to provide assurances to its Customers that the Subscriber 150 is who the Subscriber 150 says it is and to enable encrypted communications with the Subscriber's Customers (Step 201).

The Hosting Provider 160 generates a public and a private key for the Subscriber's Web Site 180 (Step 202). The keys, as is known in the art, are integral to encrypted communications capabilities between the Customer and Subscriber's Web site 180. The Hosting Provider 160 generates a Certificate Signing Request (CSR) which includes information regarding the public key and a distinguished name, i.e., a unique name conforming to a standardized format (Step 203). The Hosting Provider 160 transmits the CSR to the Subscriber 150 (Step 204).

Once the Subscriber 150 has the CSR, the Subscriber 150 may request an SSL certificate from a Certificate Authority 170 (CA) (Step 205) and start the process by transmitting the CSR to the CA 170 (Step 206). The CA 170 may verify the identity of the Subscriber 150 by, for examples, asking for copies of identification documents or by asking for information not publicly available regarding the Subscriber 150 (Step 207). If the identity of the Subscriber 150 was verified, the CA 170 will create and sign an electronic certificate (Step 208). The CA 170 will transmit the electronic certificate to the Subscriber 150 (Step 209) and the Subscriber 150 will transmit the certificate to the Hosting Provider (Step 210). The Hosting Provider will install and configure the certificate on the Subscriber's Web Site 180 thereby enabling the Subscriber's Web Site 180 to communicate using the SSL protocol (Step 211). The Subscriber's Web Site 180 is now SSL complaint and may be accessed by Customers desiring the extra security provided by the SSL protocol.

A third party, such as a Customer desiring to purchase goods and services from the Subscriber 150, may use a browser to access the Subscriber's SSL-compliant Web Site 180. Several steps are automatically performed by the browser without any interaction by the Customer and, in fact, the Customer may not even know the browser is performing these steps. The browser will request from the Subscriber's Web Site 180 the certificate 150, which includes the identity of the CA that issued the certificate. Browsers that support the SSL protocol have a list of trusted CAs and the browser will compare the CA that issued the certificate to the Subscriber 150 with the browser's list of trusted CAs. If no match is found, the browser may try to see if it can get a match to one of its trusted CAs by "chaining" the CA that issued the certificate to the Subscriber's Web Site.

The chaining process involves the browser looking at a first CA that issued the certificate to a second CA that in turn issued the certificate to the Subscriber's Web Site. By moving up the chain of issuing CAs the browser will attempt to eventually link up to the root CA. This process is helpful since the root CA is more likely to be on the browser's list of trusted CAs. If a match between a CA in the chain and a CA on the browser's list of trusted CAs is eventually found, the process for setting up an SSL connection may continue. If no match is found, i.e. the browser is unable to verify the owner of the Subscriber's Web Site 180 per the SSL protocol, the browser will typically display a security error to the user and ask if they would like to disconnect from the Web Site or ignore the error and continue.

The browser will need to get the public key from the Hosting Provider 160 for the Subscriber's Web Site 180. Hosting Providers freely give the public key to anybody that asks for it. The browser may also request from the CA 170 its Certificate Revocation List (CRL) to see if the Subscriber's 150 certificate has been revoked. Obviously, if the Subscriber 150 has had its certificate revoked by its CA 170, the browser may be programmed to refuse to establish an SSL link with the Subscriber's Web Site 180.

The SSL process allows the Subscriber's Web Site 180 and the Customer to authenticate each other through an established "hand-shaking" procedure and allows both to establish an encrypted connection. Various levels of encryption are known and may be used as appropriate once a connection has been made. For example, non-confidential information may not even be encrypted or may be encrypted with a simple cipher thereby conserving computer resources, while highly-confidential information, such as credit card numbers, may be encrypted with very sophisticated encryption algorithms to increase the security in the transmittal of the data.

The integrity of the system relies on the fact that the Hosting Provider 160 that hosts the Subscriber's Web Site 180 has maintained control over the private key at all times since the Hosting Provider 160 originally created both keys. This allows the Hosting Provider 160 to use known key-pair encryption technologies with a great deal of confidence in the security of the encryption process since the Hosting Provider 160 is able to insure that the Hosting Provider 160 is the only party to ever have access to the private key.

A problem with the prior art method of obtaining an SSL certificate for a Web site is that it involves a great deal of action by the Subscriber. Specifically, after the Subscriber requests hosting and SSL services from a Hosting Provider, the Subscriber must receive the CSR from the Hosting Provider and transmit the CSR to the CA and the Subscriber must receive the certificate from the CA and transmit the certificate to the Hosting Provider. If the Subscriber fails in coordinating the transmission of either the CSR or the certificate between the Hosting Provider and the CA, the Subscriber's efforts in making its Web site SSL-enabled will fail. Compounding the problem is the fact that few Subscribers are familiar with the process for obtaining an SSL certificate for their Web sites and would prefer to focus on the issues with their core business.

New systems and processes are therefore needed to prevent fraud on the Internet that overcome the limitations of current methods. Specifically, systems and processes are needed to simplify the process for a Subscriber to make its Web site SSL-enabled. SSL-enabled Web sites help fight fraud by having a trusted third party verify the identity of a Web site operator and by encrypting communications between the Subscriber's Web Site and its Customers. Using an SSL-enabled Web site is particularly important for Subscribers that have used a proxy service in registering their domain name since a proxy service makes it more difficult for Customers to verify the identity of the Web site operator on their own.

SUMMARY

Additional advantages and aspects of the present invention will become apparent in the following detailed description of the invention and the claims.

The invention provides systems and methods for a Subscriber to simply and easily improve the security of the communications between its Web site and its Customers. In a preferred embodiment, the Subscriber's Web site will become SSL enabled as the means for improving the Web site's security although other protocols (presently known or developed in the future), particularly those that use public and private key encryption algorithms, may also be used. The Subscriber will need to acquire, typically by registering with a Registrar, a domain name that, via the DNS, may be used to access the Subscriber's Web Site.

In a preferred embodiment, the Subscriber registers a domain name for its Web site using a proxy service whereby the proxy's contact information is stored in the publicly available WHOIS database. This embodiment includes a Hosting Provider for hosting the Subscriber's Web site and a Certificate Authority (CA) for verifying the identity of the Subscriber. Advantageously, the Hosting Provider and CA may communicate directly with each other, as opposed to prior art methods that used the Subscriber as an intermediary during their exchange of information.

In an exemplary process, the Subscriber registers a domain name and may, if the Subscriber desires to keep their contact information confidential, register the domain name using a proxy domain name registration. The Subscriber may request hosting services for the Subscriber's Web Site from a Hosting Provider. At the time the Subscriber requests hosting services, or at any time thereafter, the Subscriber may request SSL services for its Web site from either the CA or from the Hosting Provider.

If the request for SSL services was made to the CA, the CA may request a Certificate Signing Request (CSR) from the Hosting Provider. If the request for SSL services was made to the Hosting Provider, the Hosting Provider may automatically create the CSR. To maximize the efficiencies of the invention, the Hosting Provider and the CA preferably communicate directly with each other during the rest of the process without having to rely on the Subscriber as an intermediary for exchanging information.

The Hosting Provider may generate a key pair, i.e. a public key and a private key, according to Public-Key Infrastructure (PKI) techniques that are well known in the art. The Hosting Provider may transmit the created CSR to the CA. The CA may verify the identity of the Subscriber by, for examples, asking for identification documents or asking questions and verifying the answers using on-line databases. Information that may have been provided to the Hosting Provider (such as billing address, etc.) may also be used to verify the identity of the Subscriber. The CA plays the role of a trusted third party that verifies the identity of the Subscriber.

It should be noted that the step of verifying the identity of the Subscriber may be skipped in certain embodiments. While a certificate issued without verifying the identity of the Subscriber would not provide any security regarding the identity of the Subscriber, the certificate may still be used to encrypt all of the communications for the Subscriber's Web site.

The CA may electronically create and sign a certificate using the CSR. The CA may directly transmit the certificate to the Hosting Provider and the Hosting Provider may then install and configure the certificate on the Subscriber's Web site. While not the preferred method, the CA may also transmit (for example by email) the certificate to the Subscriber and allow the Subscriber to transmit the certificate to the Hosting Provider, which then installs the certificate.

The Subscriber's Web site is now SSL-enabled and Customers may purchase goods and enjoy secure communications with the Subscriber's Web Site using the SSL protocol. It should be understood that the Hosting Provider and the CA may be separate entities where each Hosting Provider may be able to communicate with a plurality of different CAs and each CA may be able to communicate with a plurality of different Hosting Provider's, typically over the Internet. This allows the Subscriber the flexibility to match any Hosting Provider with any CA that the Subscriber wants to use as long as the Hosting Provider and the CA cooperate in accordance with the present invention.

In another embodiment, the Hosting Provider and the CA may also be functions in a Facilitator's Web Server. The functions may include hardware and software necessary to perform the particular tasks of a Hosting Provider and a CA respectively. This approach greatly simplifies and speeds up the communications between the Hosting Provider and the CA since they may both reside, as non-limiting examples, on a local computer network or an Intranet, and thus may be highly integrated with each other. Whether the Hosting Provider and the CA are separate or fully integrated with each other, the Hosting Provider and the CA preferably communicate directly with each other without the need for the Subscriber to act as an intermediary in transferring information.

In yet another embodiment, a Domain Name Registering Function, a Hosting Provider Function and a CA Function are preferably integrated into a Facilitator's Computer Network (FCN). The FCN is preferably operated by a single business entity or by a group of closely related and highly coordinated business entities. While this integration is not necessary for many of the disclosed and claimed embodiments, this preferred arrangement permits these three functions to share resources, streamline communications and cooperate at a very high level.

In yet another embodiment, a method is provided for covering a plurality of domain names, where at least two domain names have different top level domains (TLDs) and/or second-level domains, with a single certificate.

In yet another embodiment, the Subscriber is subjected to a vetting process as a prerequisite to allowing the Subscriber to create an account. Once the Subscriber has access to the account, the Subscriber may request a certificate, possibly covering multiple domain names, from the account without further vetting. This may be justified since once the Subscriber has passed a first vetting process, the Subscriber would likely pass all subsequent vetting processes.

In yet another embodiment, one or more domain names may be subjected to a vetting process prior to issuing a certificate. The history and prior usage of the domain name(s) may be monitored and examined to determine if a certificate should be issued for the domain names. This may also be done in combination with subjecting the Subscriber to a vetting process.

In yet other embodiments, improved methods are provided for streamlining the process of registering a domain name and receiving a certificate for a Subscriber. In some embodiments, the domain name may be registered for the Subscriber and the certificate may be issued covering the domain name without receiving a separate request from the Subscriber for the certificate. As examples, the Subscriber may make a single request for a domain name and a certificate or the Subscriber may make a single request for only the domain name. This process eliminates a separate request from the Subscriber for the certificate.

In yet other embodiments, a credit for a certificate may be given to the Subscriber, also without receiving a separate request from the Subscriber for the credit or the certificate. The certificate or credit may be saved in a Subscriber's account to enable the Subscriber to use the certificate when needed. In yet other embodiments, a single vetting process may be used to facilitate one or more of: creating the Subscriber's account; registering the domain name; and issuing the certificate. In yet other embodiments, information from the Subscriber for creating a Subscriber's account or for registering a domain name may be used in issuing the certificate for the Subscriber.

DETAILED DESCRIPTION OF THE PREFERRED EMBODIMENTS

Figure 1:
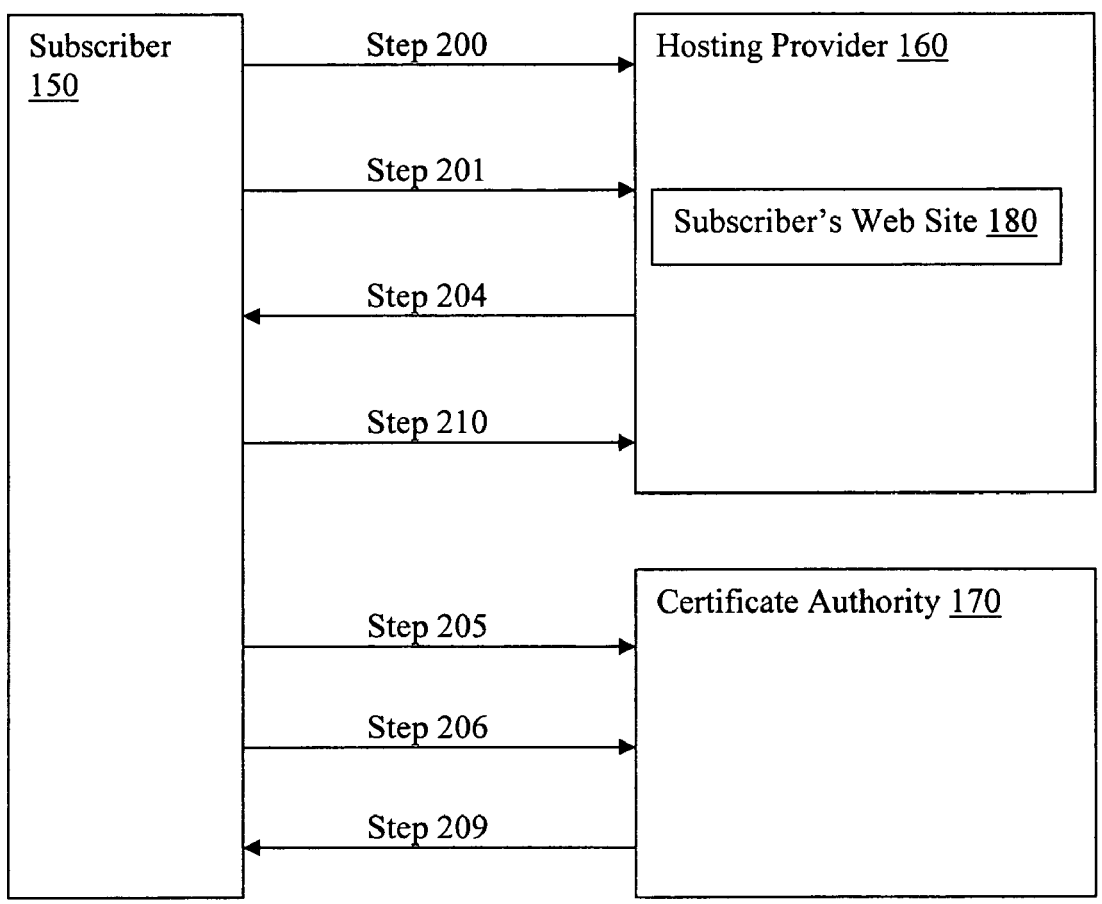
FIG. 1 is a block diagram illustrating the communication paths used in prior art methods to provide a Subscriber's Web Site with SSL capabilities.
Figure 2:
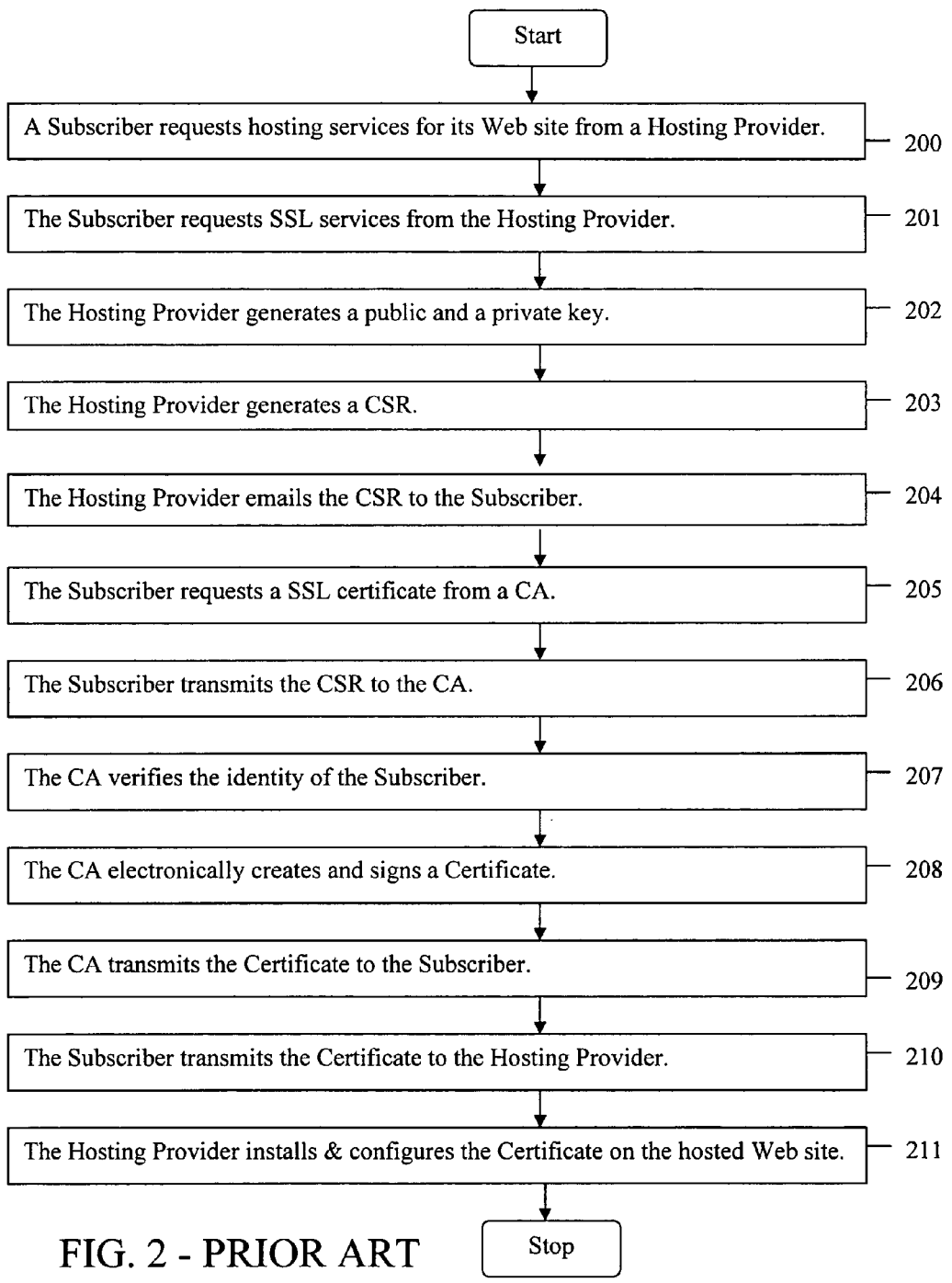
FIG. 2 is a flow chart illustrating a prior art method for providing a Subscriber's Web Site with SSL capabilities.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

As the Internet grows, fraud grows with it. Fraud not only results in actual losses, but it deters further growth of the Internet. A percentage of potential Internet Customers won't shop on-line out of fear of being a victim of fraud. The potential Customers fear a lack of security on the Internet will compromise their personal data, like email addresses and credit card numbers. Web sites that are able to remove potential Customers' fear of fraud will be at a competitive advantage compared to Web sites that are not able to effectively handle potential Customers' fear. The present invention is designed to help remove the fear Customers have in disclosing confidential information over the Internet by providing real security measures to their Internet communications. An advantage of the present invention over the prior art is that a Subscriber may more easily add security features to its Web site since the Hosting Provider and the CA are able to directly communicate with each other. The invention is not limited to any particular communication medium, but the communication preferably occurs over the Internet.

Figure 3:
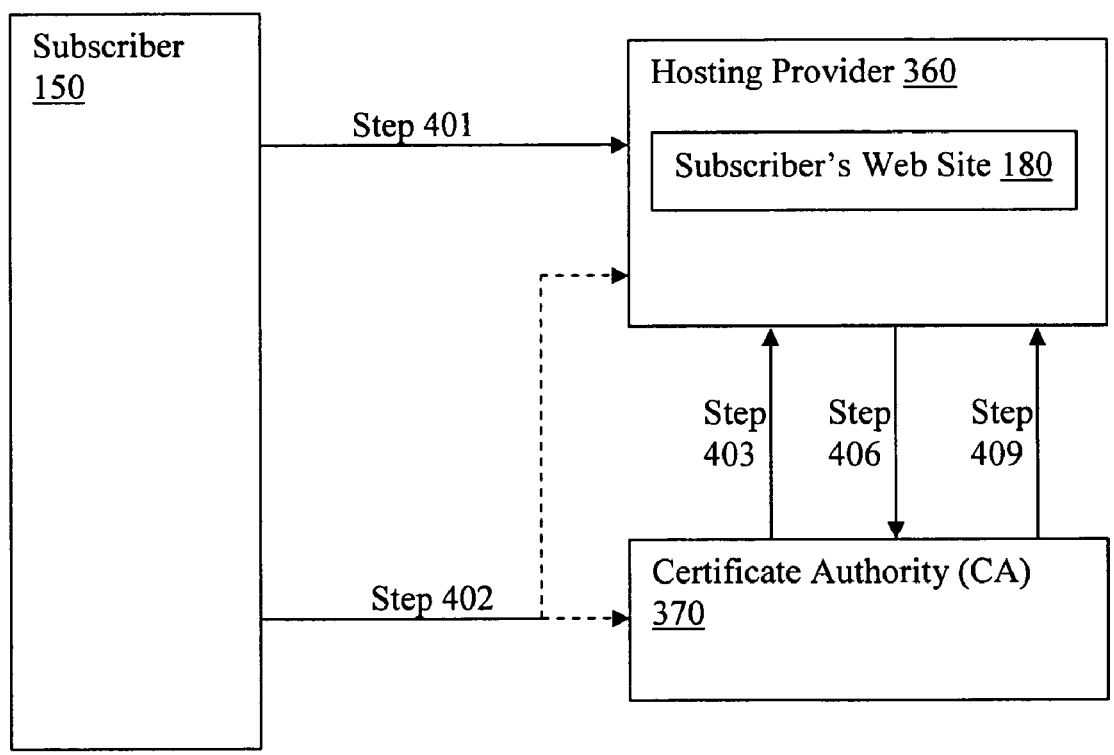
FIG. 3 is a block diagram illustrating the communication paths used in an exemplary embodiment of the invention to provide a Subscriber's Web Site with secure communications.
Figure 4:
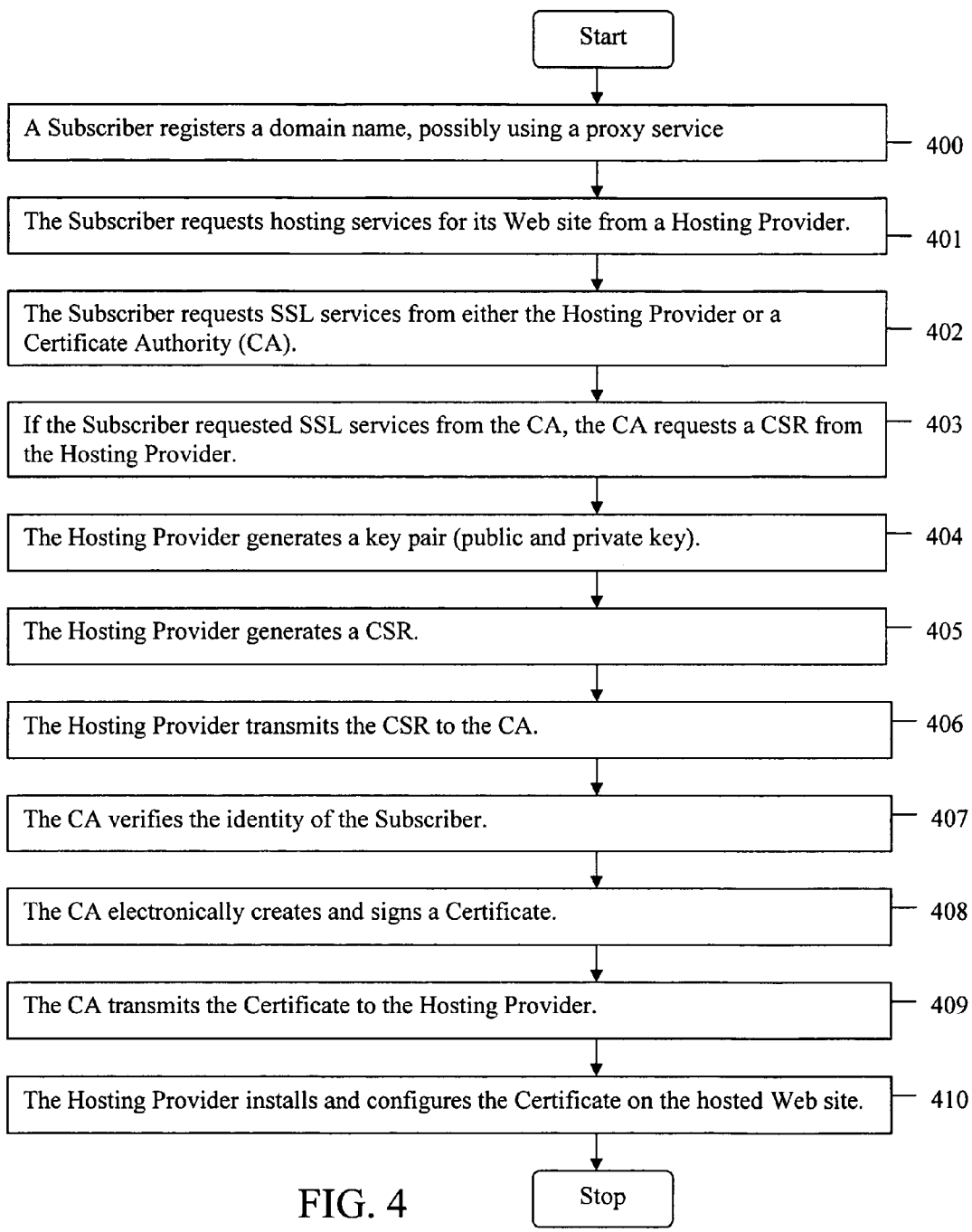
FIG. 4 is a flow chart illustrating an exemplary method for providing a Subscriber's Web Site with SSL capabilities.

The general features used in practicing the invention and their interrelationships will be discussed with reference to FIGS. 3 and 4. The invention provides a method for a Subscriber 150 to improve the security of the communications between the Subscriber's Web Site 180 and its Customers. Customers will typically be connected to the Subscriber's Web Site 180 from their personal computers via the Internet. In a preferred embodiment, the Subscriber's Web Site 180 will become SSL-enabled as the means for improving the Subscriber's Web Site's security, although other protocols (presently known or developed in the future), particularly those that use public and private key encryption algorithms, may also be used with the present invention.

The Subscriber 150 may acquire a domain name by registering a desired domain name with a Registrar. For example, the Subscriber 150 may register a domain name using Go Daddy Software, Inc. by visiting its Web site at www.godaddy.com. As part of the domain name registration process or management, the Subscriber 150 may associate the domain name with a Web site 180 via the DNS. This allows Customers to easily access the Subscriber's Web site 180 via the domain name using conventional browsers. The processes of registering domain names, creating Web sites, pointing domain names to particular Web sites via the DNS and accessing Web sites with browsers using domain names are all well known by those skilled in the art.

As part of the domain name registration process, the Subscriber 150 may register the domain name using a proxy service offered by the Registrar (Step 400). A proxy service allows the Subscriber 150 to register and have legal rights to the domain name, while allowing the proxy service to insert its contact information in the publicly accessible WHOIS database. Proxy domain name registrations may be obtained, for example, from Domains By Proxy, Inc. at www.domainsbyproxy.com. Further information regarding proxy domain name registrations may be obtained in U.S. patent application Ser. No. 10/624883 titled "METHOD AND SYSTEM FOR DOMAIN NAME REGISTRATION AND EMAIL BY PROXY" filed on Jul. 21, 2003 which is hereby incorporated by reference.

While a proxy service protects the Subscriber's personal contact information from people who may want to use it for inappropriate purposes, such as identity theft or spamming, it also blocks Customers from personally verifying the identity of the Subscriber 150 through the use of the publicly available WHOIS information. Thus, Subscribers 150 that use proxy domain name registrations have a heightened need for reassuring their Customers that they are who they say they are since the Customer may be passing confidential information, such as personal contact information or credit card numbers, to the Subscriber 150. For this reason, it is particularly valuable for a Web site with a proxy domain name registration to be SSL-enabled, as this lets the Subscriber's Customers know that a trusted third party has verified the identity of the Subscriber 150.

The Subscriber 150 may request and receive hosting services from a Hosting Provider 360 for the Subscriber's Web site 150 (Step 401). Such services may be obtained by contacting the Hosting Provider 360, for example, by logging onto a Hosting Provider's Web Site. One such Hosting Provider is Go Daddy Group, Inc. with a Web site located at www.godaddy.com.

The Subscriber 150 may request SSL services for the Subscriber's Web Site 180 either from a CA 370 or from its Hosting Provider 360 (Step 402). If the request for SSL services was made to the CA 370, the CA 370 may request a Certificate Signing Request (CSR) from the Subscriber's Hosting Provider 360 (Step 403). To maximize the efficiencies of the invention, the Hosting Provider 360 and the CA 370 preferably communicate directly with each other during the rest of the process without having to rely on the Subscriber 150 as an intermediary.

The Hosting Provider 360 may generate a key pair, i.e. a public key and a private key, according to Public-Key Infrastructure (PKI) techniques known in the art (Step 404). The Hosting Provider 360 uses the private key and the Subscriber's Customers use the public key to permit encrypted communications between the Subscriber's Web Site 180 and its Customers.

The Hosting Provider 360 may also generate a Certificate Signing Request (CSR) which may include the public key and a unique name, commonly known as a distinguished name in the art, for the Subscriber's Web Site 180 (Step 405). For maximum security and integrity of the system, the Hosting Provider 360 should never reveal the private key and maintain the private key in strict confidence.

In contrast with prior art methods, the Hosting Provider 360 and the CA 370 may communicate directly with each other during the remaining portions of the process without having to rely on the Subscriber 150 as an intermediary in communicating information. The Hosting Provider 360 may transmit the CSR to the CA 370 (Step 406).

The CA 370 may verify the identity of the Subscriber 150, for example, by asking the Subscriber 150 for identification documents or by asking the Subscriber 150 questions and verifying the answers using on-line databases (Step 407). The CA 370 may contact the Subscriber 150 directly, possible either via e-mail or by having the Subscriber 150 link to the CA's Web site. Another alternative is for the Hosting Provider 360 to pass questions or document requests from the CA 370 to the Subscriber 150 and then facilitate the transfer of the answers or documents from the Subscriber 150 to the CA 370.

Asking for identification documents via mail or even fax will slow the process down, but may provide a strong document based identification process. Asking for answers available in on-line databases produce identifications much faster, but typically at the expense of being less reliable. The identification process may be done as thoroughly as possible so that Customers may rely and trust that the Subscriber 150 has been properly identified by the CA 370 and the Subscriber 150 is whom the Subscriber 150 claims to be. In other embodiments, the verification process may be brief or skipped altogether. Removing the verification process removes any assurances that the Subscriber 150 is who the Subscriber 150 says he/she is, but would still allow the Subscriber's Web site 180 to communicate using an encryption protocol. The advantage of a fast verification process is that the Subscriber's Web Site 180 will be on-line and available for business sooner and at a lower cost.

The CA 370 plays the role of an impartial trusted third party authority that verifies the identity of the Subscriber 150. Once the Subscriber's 150 identity has been verified, the CA 370 may electronically create and sign a certificate (Step 408). Obviously, if the CA 370 is unable, possibly after several attempts using different methodologies, to verify the identity of the Subscriber 150, the process may be terminated and the Subscriber's Web Site 180 will not receive the benefits of having encrypted communications capability. The CA 370 may also create and distribute a Certification Revocation List to keep track of certificates that are no longer valid. The CA 370 may transmit this list to anybody that asks for it.

After the Subscriber's 150 identity has been verified by the CA 370, the CA 370 may directly transmit the certificate to the Hosting Provider 360 (Step 409) and then the Hosting Provider 360 may install and configure the certificate on the Subscriber's Web site 180 (Step 410). The Subscriber's Web site 180 is now SSL-enabled and Customers may purchase goods and services from the Subscriber's Web site 180 and benefit from secure communications with the Subscriber's Web Site 180 using the SSL protocol.

In a preferred embodiment, the CA 370 is a root Certificate Authority that is recognized by the most commonly used browsers. In another embodiment, the CA 370 may be linked, possible via several intermediate Certificate Authorities, to a Certificate Authority that is widely recognized by the most commonly used browsers. Thus, the CA 370 may be a single root SSL, i.e. the CA is directly recognized by most browsers, or a chained root SSL, i.e. the CA inherits its certification from another CA. The CA 370 may be several levels from a root CA. If the CA 370 is not recognized or is not linked to a Certificate Authority that is recognized by a browser, the browser preferably warns the Customer and either terminates the communications or allows the Customer the option to terminate or continue using the SSL protocol. Thus, it is important for the CA 370 to be widely recognized by commonly used browsers or to be "chained" or linked to a Certificate Authority that is widely recognized by commonly used browsers.

In another embodiment of the invention, the Hosting Provider 360 and the CA 370 operate from different servers or computer networks that preferably can communicate directly with each other, for example over the Internet, as described in this invention. In practice, there may be many Hosting Providers and CAs available for Subscribers to use. This allows the Subscriber 150 the flexibility to match any Hosting Provider 360 with any CA 370 that the Subscriber 150 wants to use as long as the Hosting Provider 360 and the CA 370 are set-up to communicate with each other and perform the processes in accordance with the present invention.

Figure 5:
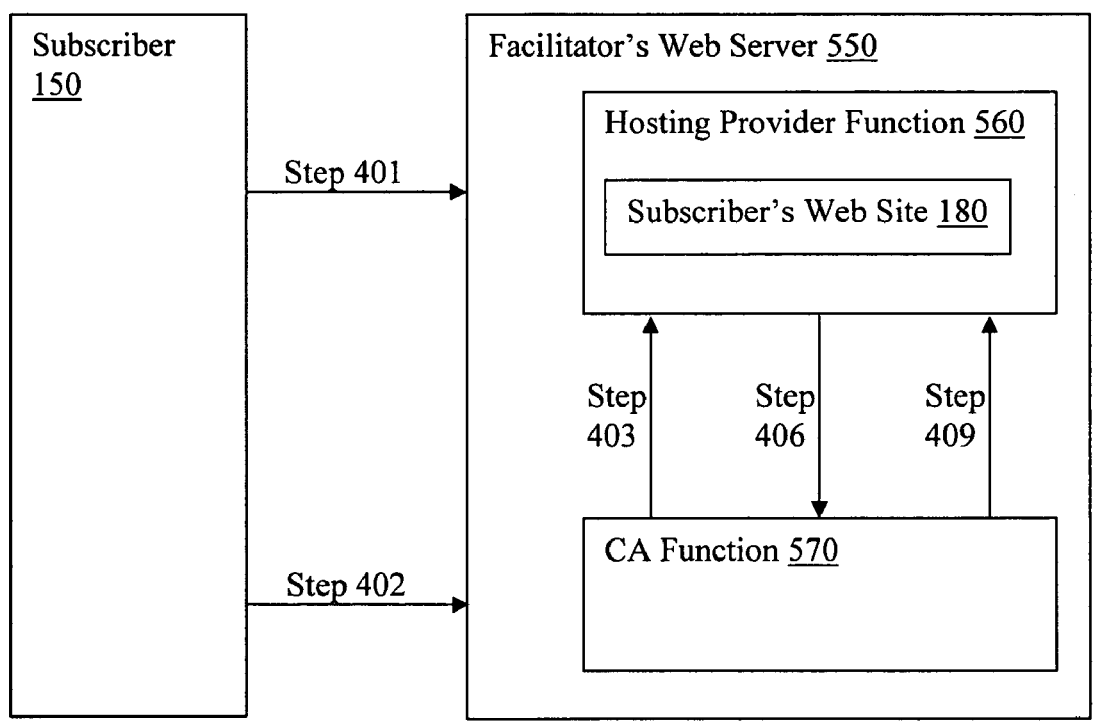
FIG. 5 is a block diagram illustrating the communication paths used in another embodiment of the invention to provide a Subscriber's Web Site with secure communications.

In yet another embodiment of the invention, as generally illustrated in FIG. 5, a Hosting Provider Function 560 and a CA Function 570 may reside on a single Facilitator's Web Server 550. In this approach the Hosting Provider Function 560 and the CA Function 570 perform the tasks previously disclosed for the Hosting Provider 360 and the CA 370 respectively. This embodiment greatly simplifies the communication process between the Hosting Provider Function 560 and the CA Function 570 since both Functions may be performed on a single server or local computer network and thus may be highly integrated with each other. They may share software and hardware resources and even be integrated into the same software and hardware system.

Figure 6:
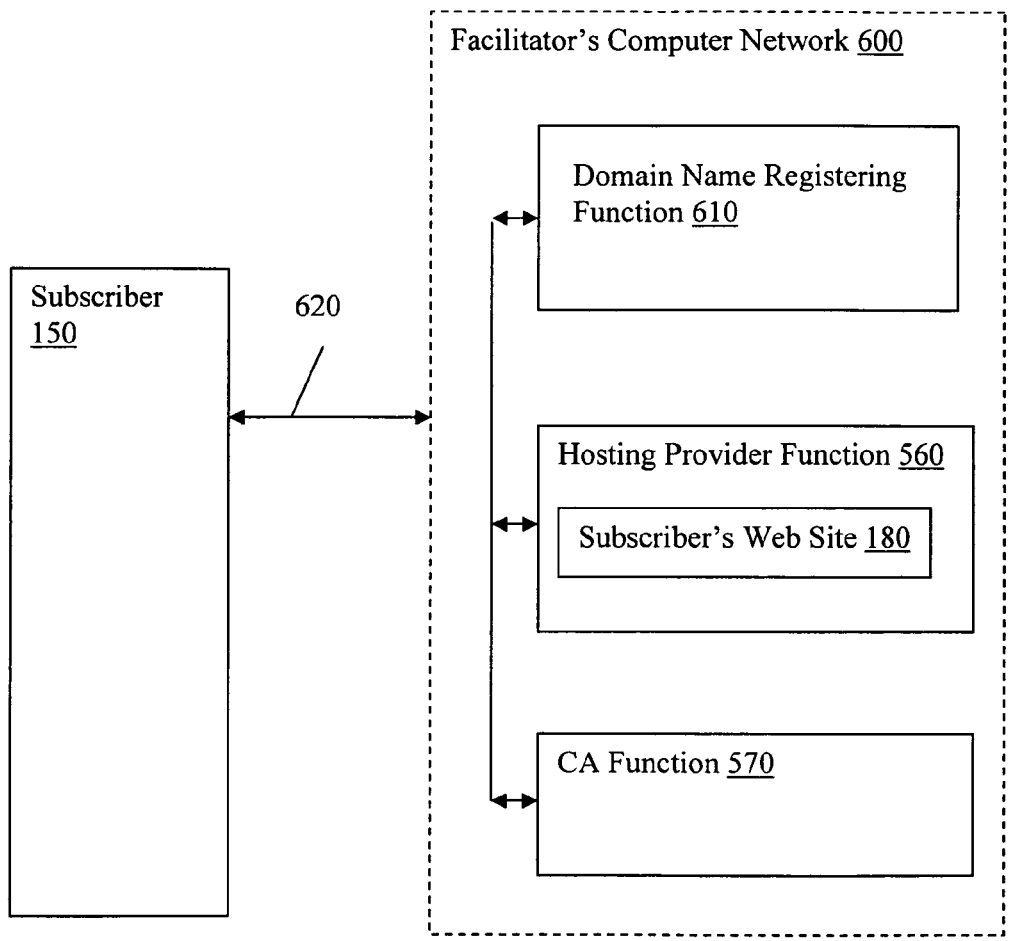
FIG. 6 is a block diagram illustrating an exemplary arrangement of functional elements for certain embodiments of the invention.
Figure 7:
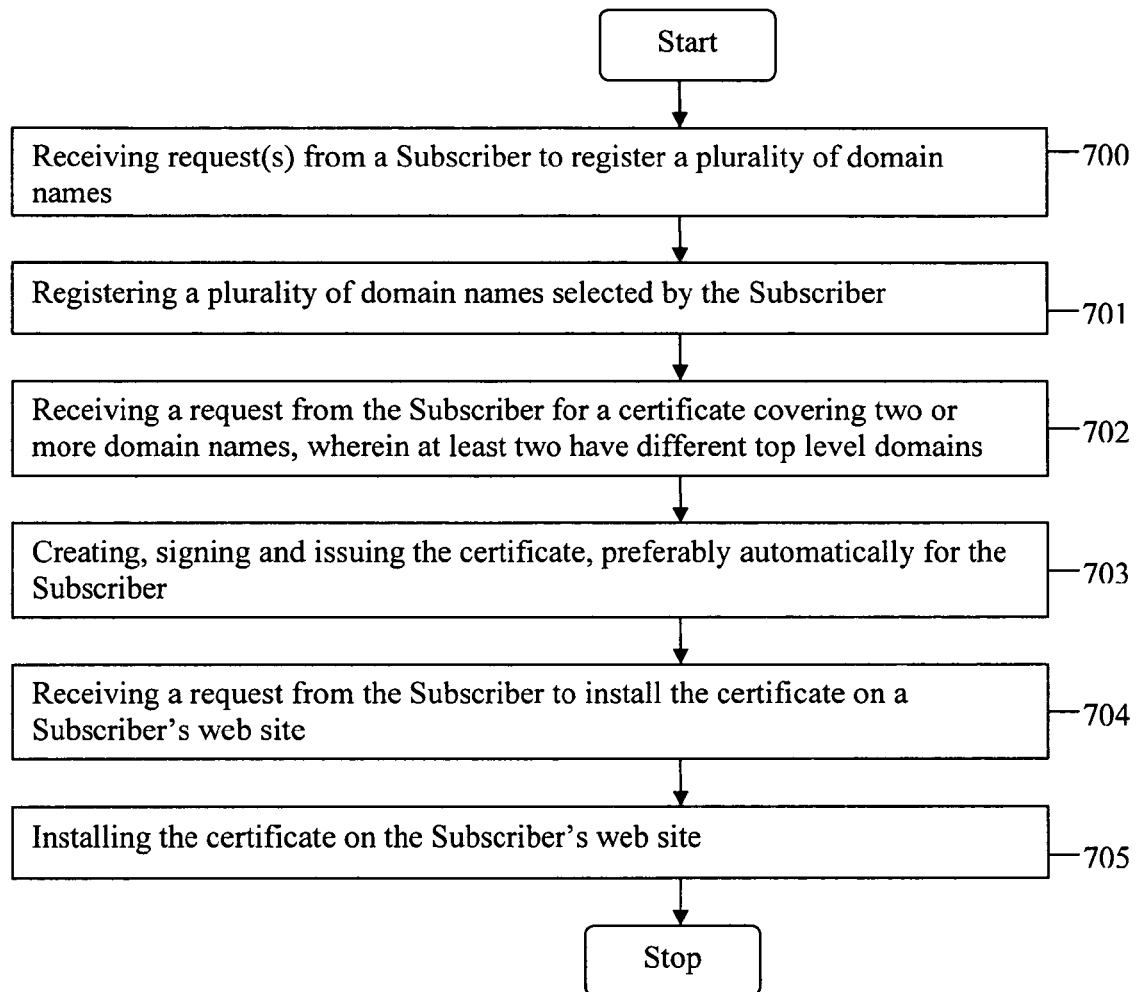
FIG. 7 is a flow chart illustrating an exemplary method of issuing a certificate for a plurality of domain names.
Figure 8:
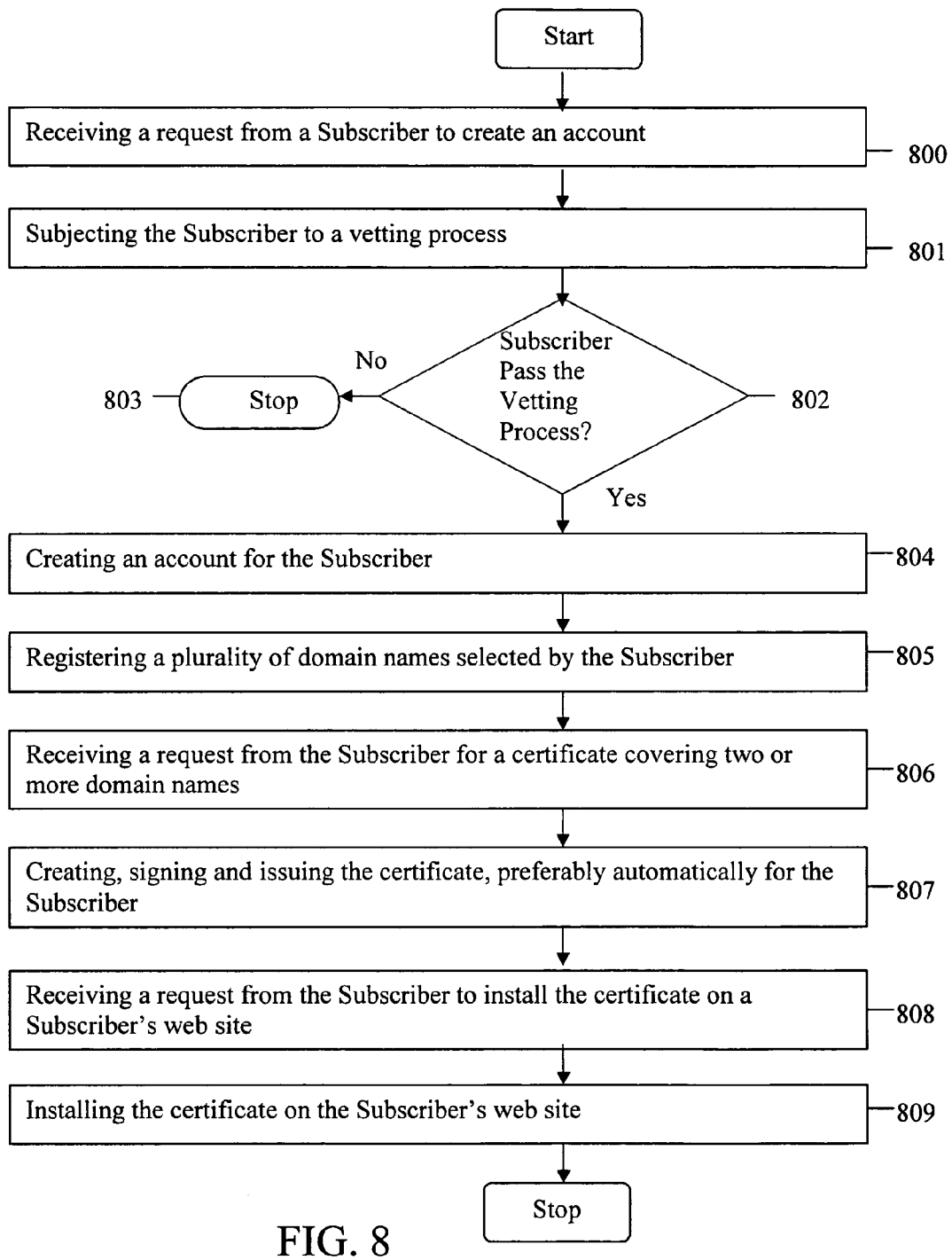
FIG. 8 is a flow chart illustrating another exemplary method of issuing a certificate for a plurality of domain names.
Figure 9:
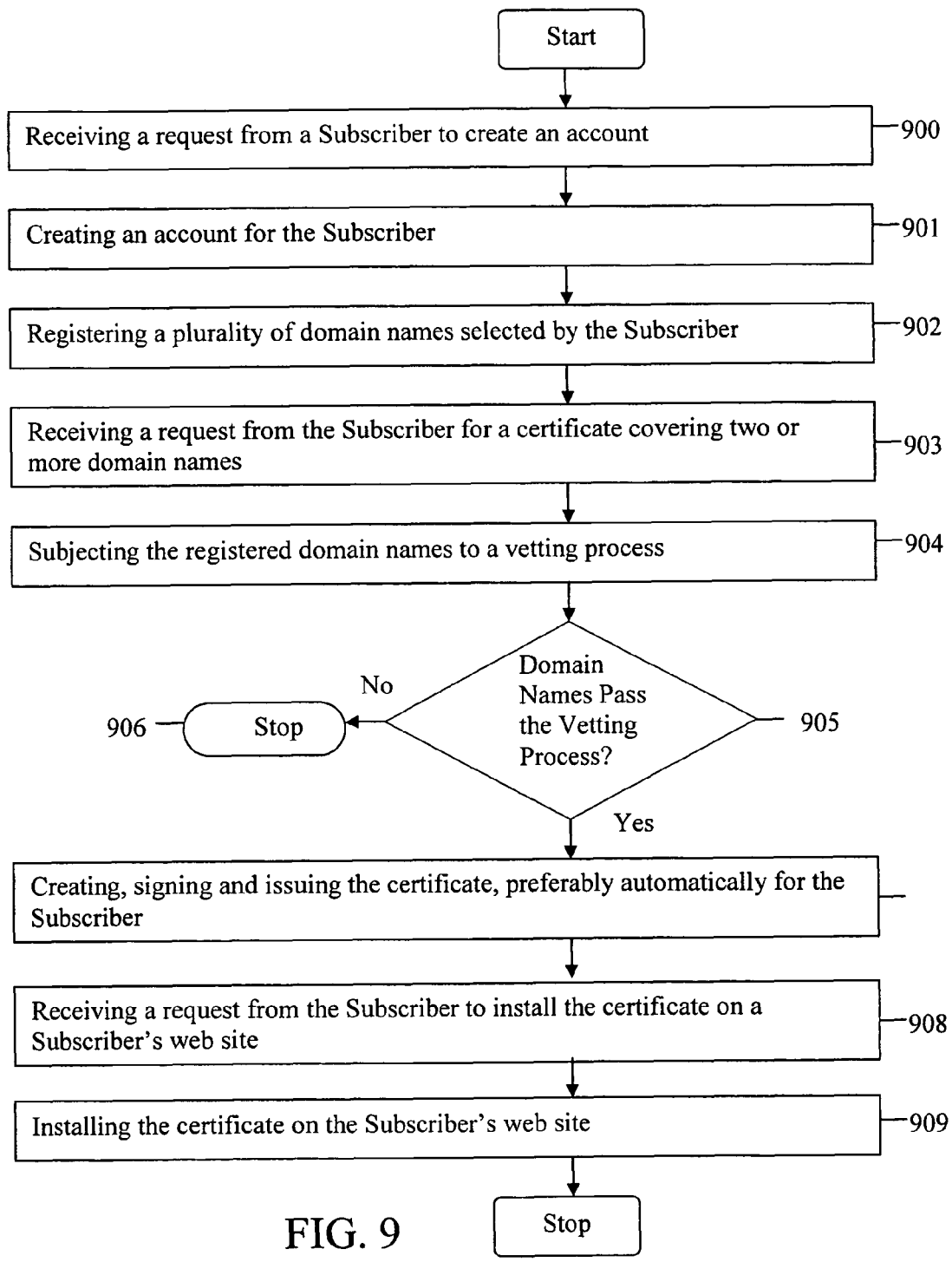
FIG. 9 is a flow chart illustrating another exemplary method of issuing a certificate for a plurality of domain names.

FIG. 6 illustrates a preferred arrangement of functions for the exemplary methods disclosed in the flowcharts of FIG. 7, FIG. 8, and FIG. 9. Specifically, these methods are preferably performed by a Facilitator's Computer Network 600 (FCN) that includes a Domain Name Registering Function 610, a Hosting Provider Function 560, and a Certificate Authority (CA) Function 570. While certain synergies may be achieved by integrating these functions as illustrated in FIG. 6 (such as the faster exchange of information and the ability to share hardware and software), one or more of these functions 610, 560, and 570 may be separate and performed on a different computer network and/or operated by a different entity. Breaking these functions 610, 560 and 570 apart allows the Subscriber 150 to pick and choose the particular provider the Subscriber wants to use for each of these functions.

The FCN 600 may be accessed by a Subscriber 150 via an Internet connection 620. If the FCN 600 does not contain all the functions 610, 560, and 570 illustrated in FIG. 6, the Subscriber 150 and the FCN 600 may access the missing function(s) through services offered by third parties, typically via the Internet. Even if the FCN 600 includes all the shown functions, the Subscriber 150 may still access particular function(s) offered by third parties.

FIG. 7 illustrates an exemplary method for issuing a secure certificate according to another embodiment of the invention. A Subscriber 150 may connect to the FCN 600 via a communication pathway, such as the Internet 620. The FCN 600 will typically have a Web site that the Subscriber 150 may access, specifically designed for this purpose. The Subscriber 150 may make one or more requests to register one or more domain names (Step 700). Assuming the domain names are available, the FCN's 600 Domain Name Registering Function 610 may register the domain names selected by the Subscriber 150 (Step 701). At the time of requesting registration for the domain names or at any time thereafter, the Subscriber 150 may request a certificate that covers a plurality of the domain names registered by the Subscriber, even if two or more of the domain names have different top level domains (TLDs) and/or different second-level domains (Step 702). The two or more domain names may be listed on the certificate as common or alternative domain names.

The certificate covering two or more domain names may be created, signed and issued, preferably automatically, for the Subscriber 150 (Step 703). While the certificate may be created the traditional way, i.e. requiring the Subscriber 150 to get a CSR from a hosting provider and then transmitting the CSR to a CA, in a preferred embodiment the Hosting Provider Function 560 and the CA Function 570 automatically (from the Subscriber's perspective) take the necessary steps to create, sign and issue the certificate. A copy of the newly created certificate may be transmitted, such as by email, to the Subscriber 150 and another copy may be saved on the FCN 600.

Once the Subscriber 150 has the certificate covering two or more domain names, the Subscriber 150 may request that the certificate be installed on the Subscriber's web site 180 (Step 704). The Hosting Provider Function 560 is preferably integrated with the FCN 600 so that the certificate may be easily communicated to the Hosting Provider Function 560 automatically for the Subscriber 150. If the Hosting Provider Function 560 is not part of the FCN 600, the certificate may be transmitted to another Hosting Provider Function 560 either by the Subscriber 150 or by the FCN 600. Once the Hosting Provider Function 560 or Third Party Hosting Provider has the certificate, the certificate may be installed for the Subscriber's Web site (Step 705).

FIG. 8 illustrates another exemplary embodiment of the invention. In this embodiment, a Subscriber 150 may request to create an account with a Domain Name Registering Function 610 (Step 800). The Domain Name Registering Function 610 will typically be a Registrar, but may also be a Reseller for a Registrar or any entity or function capable of registering domain names. The Subscriber 150 may be subjected to a vetting process. (Step 801) The vetting process may be used to simply verify the identity of the Subscriber 150 and/or to determine a reputation or trustworthiness of the Subscriber 150 (Step 802). If a certificate is to be issued that provides minimal or no level of trustworthiness associated with the certificate, the vetting process may be skipped.

If the Subscriber 150 does not pass the vetting process, i.e. the Subscriber's identity was not able to be verified and/or the reputation or trustworthiness of the Subscriber 150 was not sufficient based upon some predetermined criteria, an account is not created for the Subscriber 150 (Step 803). However, if the Subscriber 150 passed the vetting process, an account may be created for the Subscriber 150 (Step 804). This approach gives the created account a certain level of trustworthiness so that all actions later taken by the Subscriber 150 logged into the account may be trusted without revetting the Subscriber 150 for subsequent actions.

Specifically, the Subscriber 150 may register a plurality of domain names from within the account (Step 805) and request a certificate covering two or more of the domain names (Step 806). Since the Subscriber 150 was vetted to create the account, the Subscriber 150 is preferably not vetted again. The certificate may be created, signed and issued, preferably automatically as previously described or by any other method known or developed in the future for creating certificates (Step 807). The Subscriber 150 may request the certificate be installed on the Subscriber's Web site (Step 808) and the certificate may be installed (Step 809).

FIG. 9 illustrates another embodiment of the invention. In this embodiment the Subscriber 150 may request (Step 900) and receive a created account (Step 901) for registering domain names and accessing other domain name related services. The Subscriber 150 may register a plurality of domain names all at once or over a period of time (Step 902). The Subscriber 150 may request a certificate for two or more domain names (Step 903). Since the Subscriber 150 was not necessarily vetted for this embodiment (although for added security the Subscriber 150 may also have been vetted), the domain names may be subjected to a vetting process (Step 904). The domain names may be examined to see if they were used in the past for spamming, phishing or for other fraudulent or abusive Internet uses (Step 905). The domain names may also be examined for positive uses such as a long time use with a reputable web site. Further details regarding methods for determining domain name reputation are disclosed in the U.S. patent application Ser. No. 11/306,612; filed Jan. 4, 2006 and titled "DOMAIN NAME RELATED REPUTATION AND SECURE CERTIFICATES" and that patent application is hereby incorporated in its entirety by this reference.

Domain names that do not pass the vetting process may be denied a certificate (Step 906). As an option for obtaining a higher level of security, a certificate may even be denied for domain names in the same account as a domain name that does not pass the vetting process. A certificate may be created, signed and issued for domain names that pass the vetting process (Step 907). As in other embodiments, this step is preferably automatically performed by the FCN 600 for the Subscriber 150. Once issued, a copy of the certificate may be email to the Subscriber 150 and a copy may be retained by the FCN 600. As in previous embodiments, the Subscriber 150 may request the certificate be installed on the Subscriber's web site (Step 908) and the certificate may be so installed (Step 909).

As an overall strategy, the level of trustworthiness for the issued certificate may be fine-tuned in the various disclosed embodiments by combining, adjusting, adding or eliminating the vetting processes of the Subscriber 150 and the domain names. A certificate providing minimal to no trustworthiness may be issued by eliminating all vetting processes and a certificate providing a high level of trustworthiness may be issued by incorporating aggressive vetting processes of the Subscriber and domain names.

It should be noted that all references, whether in the specification or claims, to the Subscriber requesting services from the Hosting Provider, CA, Domain Name Registering Function, FCN or Facilitator's Web Server include the embodiments, unless specifically stated otherwise, of the Subscriber requesting these services directly, through an agent or through a Reseller to the service provider. Resellers are particularly advantageous in that they provide another marketing channel without increasing the complexity of the overall process for the Subscriber. Specifically, a Reseller may collect fees and information from the Subscriber and then permit, assist or proceed with the above described processes for the benefit of the Subscriber.

FIGS. 10-16 illustrate embodiments of the invention for efficiently registering a domain name for a Subscriber 150, obtaining a certificate covering the domain name, and installing the certificate on a Subscriber's Web Site 180. The steps in FIGS. 10-16 may be performed by a Registrar (or Reseller), CA 370, and a Hosting Provider 360 coordinating their functions together. Also, two of these three may be combined (such as shown by the Facilitator's Web Server 550 illustrated in FIG. 5) into a single entity to practice the invention. However, in a preferred embodiment, all three are combined (such as the FCN 600 illustrated in FIG. 6) into a single, and well coordinated, entity to practice the invention. The integration of two or more functions allows for more efficient communications and use of computer hardware and software. While using the FCN 600 is the preferred method, and will be used in describing the embodiments of FIGS. 10-16, it should be noted that one or two of the functions may be broken out and operated as separate entities.

Figure 10:
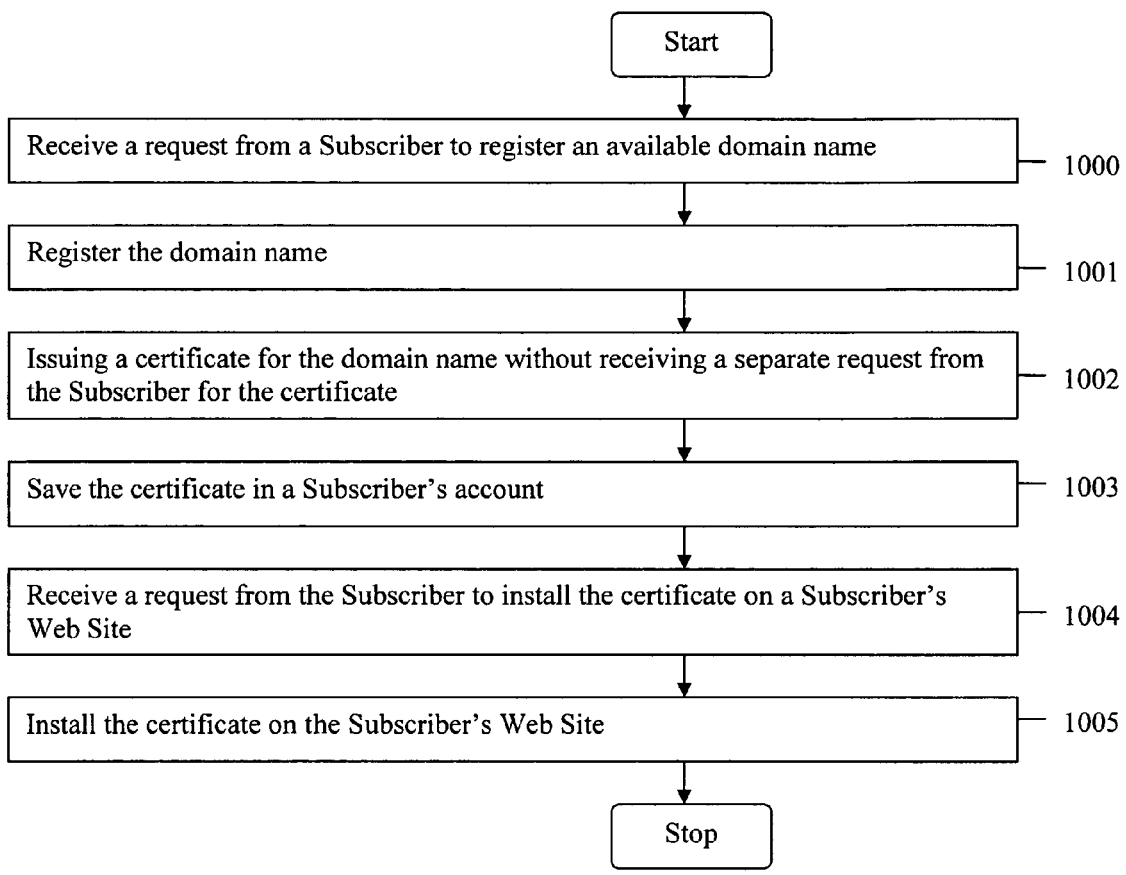
FIG. 10 is a flow chart illustrating an exemplary method of issuing and installing a certificate for a Subscriber.

FIG. 10 illustrates an exemplary method of practicing the invention. A Subscriber 150 may connect to a FCN's 600 Web Site and request to register an available domain name (Step 1000). Information may be displayed on the FCN's 600 Web Site informing the Subscriber 150 that if the Subscriber 150 registers the domain name, the Subscriber 150 may receive the certificate or in certain embodiments, a credit for a certificate. The request to register the domain name may be silent in regards to issuing the certificate or the request may include, either explicitly or implicitly, a request for the certificate. For example, the Subscriber 150 may select an option on the FCN's 600 Web Site that explicitly states that the credit or the certificate will be given or issued for the domain name as a result of the Subscriber registering the domain name.

The FCN's Web Site may have one or more fields specifically designed for receiving domain name registration information. As part of the domain name registration process, the Subscriber 150 may have to enter certain information into the FCN's Web Site, such as contact information. The FCN 600 may also assist the Subscriber 150 by providing additional domain names to choose from and by verifying whether the domain names are in fact available for registration.

After receiving the request from the Subscriber 150 to register the domain name, the FCN 600 may register the domain name with an appropriate Registry (Step 1001). In certain embodiments, the domain name may be registered via a proxy registration, i.e., using contact information from the FCN 600 to be stored in the public WHOIS database so that the Subscriber's personal information may be confidentially stored with the FCN 600. Once the domain name has been registered, a confirmation email may be sent to the Subscriber 150 describing the results of the registration process.

The FCN 600 may issue a certificate, for example, by using methods generally known in the art, by using compatible methods developed in the future or by using methods previously discussed. In preferred embodiments, the certificate is created and signed by a CA function 570 within the FCN 600. To issue the certificate, additional information may have to be obtained from the Subscriber 150. However, the information from creating a Subscriber's account or the information from registering the domain name may also be used to issue the certification, thereby eliminating the step of having the Subscriber 150 reenter the Subscriber's information.

The certificate is preferably issued without receiving a separate request from the Subscriber 150 for the certificate (Step 1002). The request from the Subscriber 150 to register the domain name may either explicitly or implicitly mention receiving the certificate, but the request does not have to mention the certificate. Eliminating the need for a separate or additional request from the Subscriber 150 for a certificate simplifies the certificate process and helps to insure that the Subscriber's Web Site 180 will eventually enjoy the benefits of having an installed certificate.

If the Subscriber 150 does not want to immediately install the certificate, it may be saved in a Subscriber's account (Step 1003). This permits the Subscriber 150 to wait for a more convenient time to install the certificate on the Subscriber's Web Site 180. There are many reasons the Subscriber 150 may wish to delay the installation of the certificate, such as when the Subscriber's Web Site 180 has not yet been created or hosted. If the Subscriber 150 wants to immediately install the certificate, Step 1003 may be skipped.

The Subscriber 150 may request that the issued certificate be installed and configured on the Subscriber's Web Site 180 (Step 1004). Step 1004 may be completed contemporaneously with the registration of the domain name or, if the certificate was saved, at some future date. It is also possible to skip Step 1004 in certain embodiments. For example, the FCN 600 may be able to determine, by searching the Subscriber's account or by reviewing the domain name, the Subscriber's Web Site 180 and install the certificate on the Subscriber's Web Site 180 without receiving specific input from the Subscriber 150 to install the certificate. In other embodiments, the FCN 600 may wait until a hosting account is set up and then issue the certificate.

The certificate may be installed on the Subscriber's Web Site 180 (Step 1005). In preferred embodiments, the issuing and installing of the certificate on a Web Site 180 are done within the FCN 600 as previously explained, thereby greatly simplifying the process for the Subscriber 150.

Figure 11:
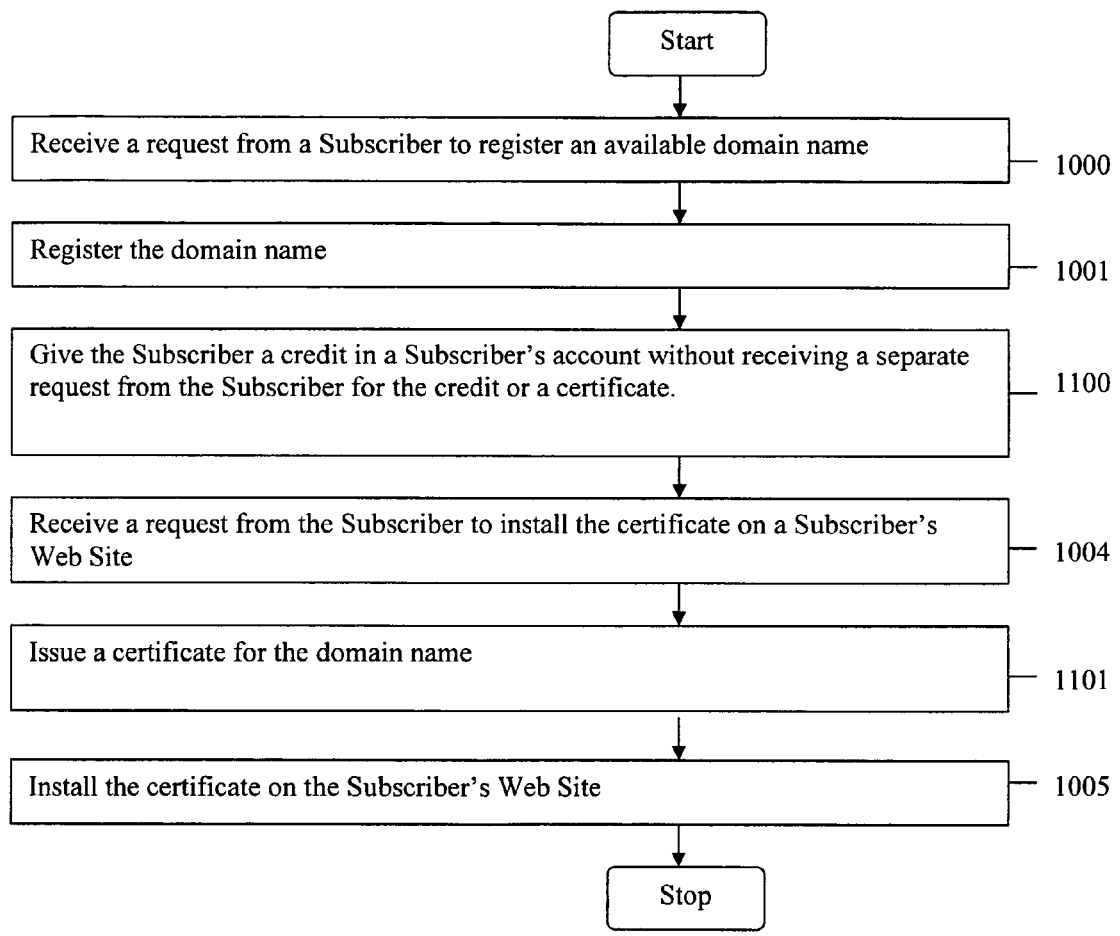
FIG. 11 is a flow chart illustrating an exemplary method of issuing and installing a certificate by first giving a credit to a Subscriber for the certificate.

FIG. 11 illustrates another embodiment of the invention to efficiently issue and install a certificate on the Subscriber's Web Site 180. In this embodiment, instead of always issuing (and possibly saving) a certificate for later use as shown in connection with FIG. 10, a credit for the certificate is placed in the Subscriber's account without receiving a separate and additional request from the Subscriber 150 for the credit or certificate (Step 1100). Saving the credit instead of the certificate reduces the work load for the FCN 600, since the certificate does not need to be issued until the credit is actually used. Since Subscribers 150 often do not want certificates for all their domain names, fewer resources are needed to implement this embodiment. The Subscriber 150 may then redeem the credit at the Subscriber's convenience in order to issue the certificate (Step 1101). The certificate may be issued based on an explicit request from the Subscriber 150, after the Subscriber 150 requests the certificate be installed on the Subscriber's Web Site 180, or after the Subscriber 150 has set up a hosting account.

Figure 12:
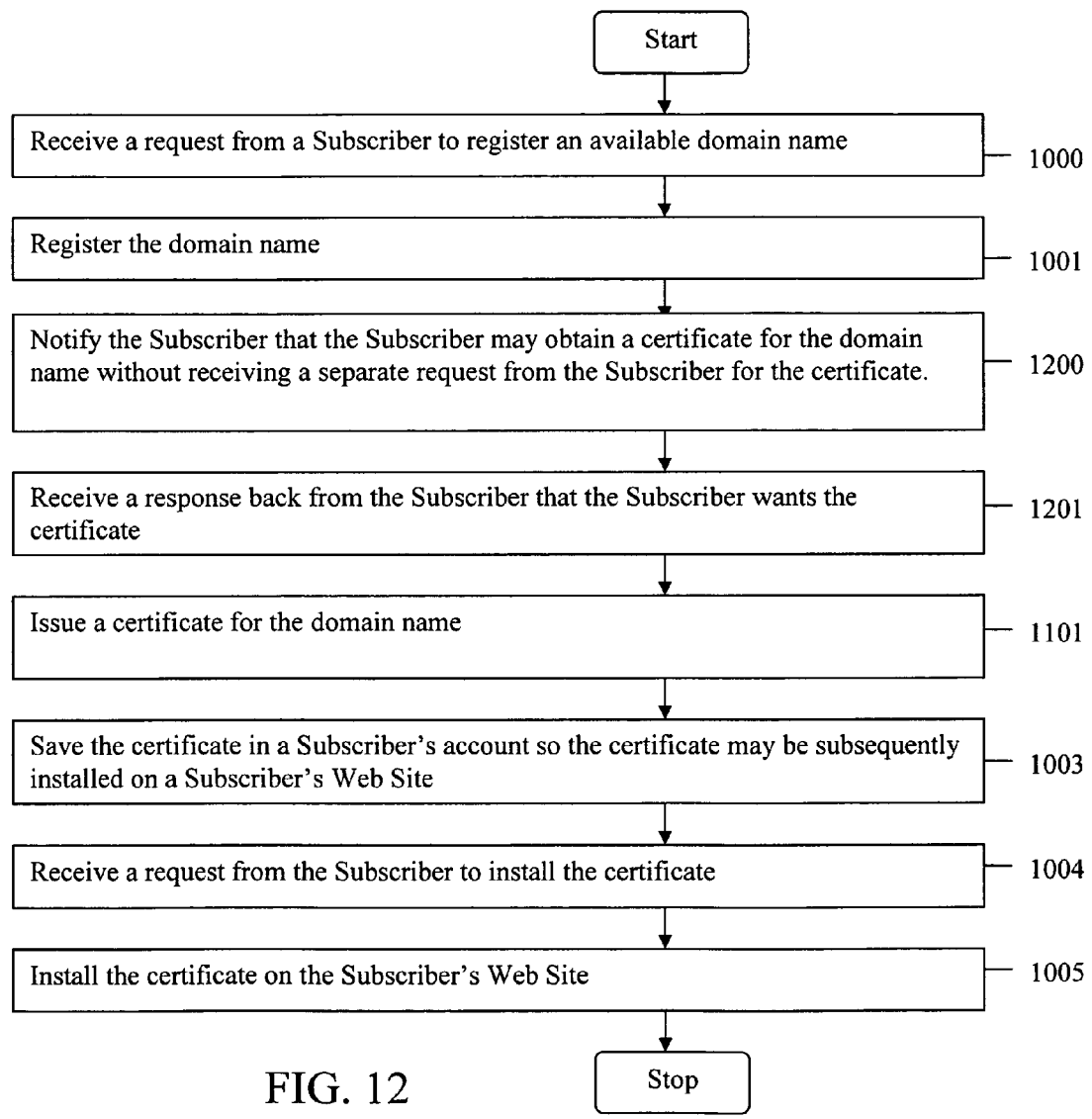
FIG. 12 is a flow chart illustrating an exemplary method of issuing and installing a certificate by notifying a Subscriber of the availability of the certificate.

FIG. 12 illustrates another embodiment of the invention to efficiently issue and install a certificate on the Subscriber's Web Site 180. This embodiment is also similar to the embodiment illustrated in FIG. 10, except that the Subscriber 150 is notified after submitting a request to register a domain name that a certificate may also be obtained. The notice may be provided to the Subscriber 150 without receiving an additional request from the Subscriber for the certificate (Step 1200). If the Subscriber 150 acknowledges the desire for the certificate (Step 1201), the process may be continued to issue and eventually install the certificate on the Subscriber's Web Site 180. The advantage of this embodiment is that while streamlining the process for obtaining a certificate, neither a credit nor a certificate must be saved unless the Subscriber 150 affirmatively acknowledges wanting the certificate. This embodiment would also save on resources for those domain names where the certificate is not desired.

Figure 13:
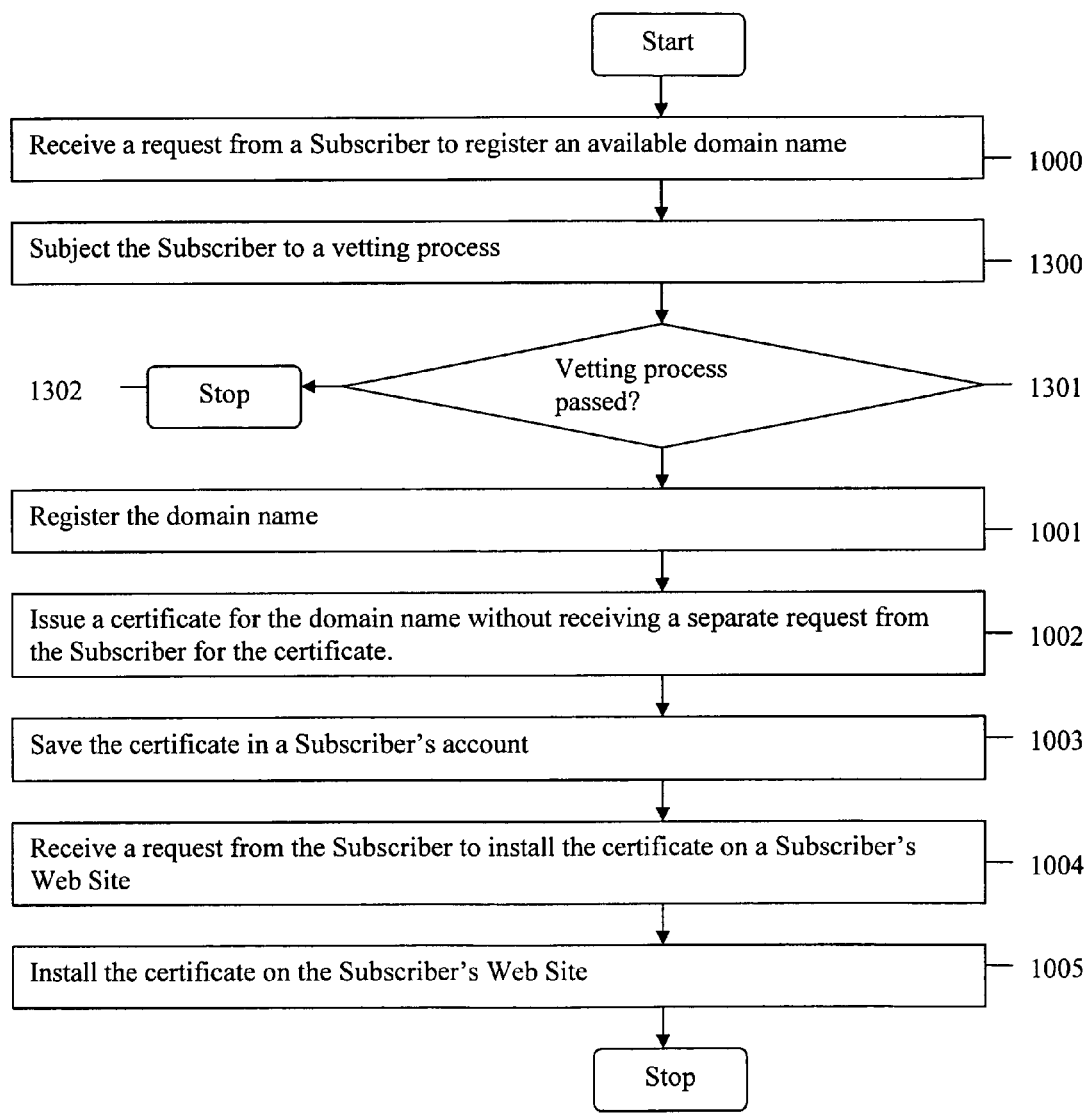
FIG. 13 is a flow chart illustrating an exemplary method of issuing and installing a certificate after vetting a Subscriber.

FIG. 13 illustrates another embodiment of the invention to efficiently issue and install a certificate on the Subscriber's Web Site 180. This embodiment is also similar to the embodiment illustrated in FIG. 10, except that the Subscriber 150 is vetted after requesting to register a domain name (Step 1300). The vetting process may be used to verify the information used to register the domain name and to verify the information used to obtain a certificate. Using a single vetting process simplifies the process of registering domain names and obtaining certificates. The process of registering the domain name and obtaining a certificate is only continued if the Subscriber 150 passes the vetting process (Step 1301). If the vetting process is not passed, the process may be terminated (Step 1302).

Figure 14:
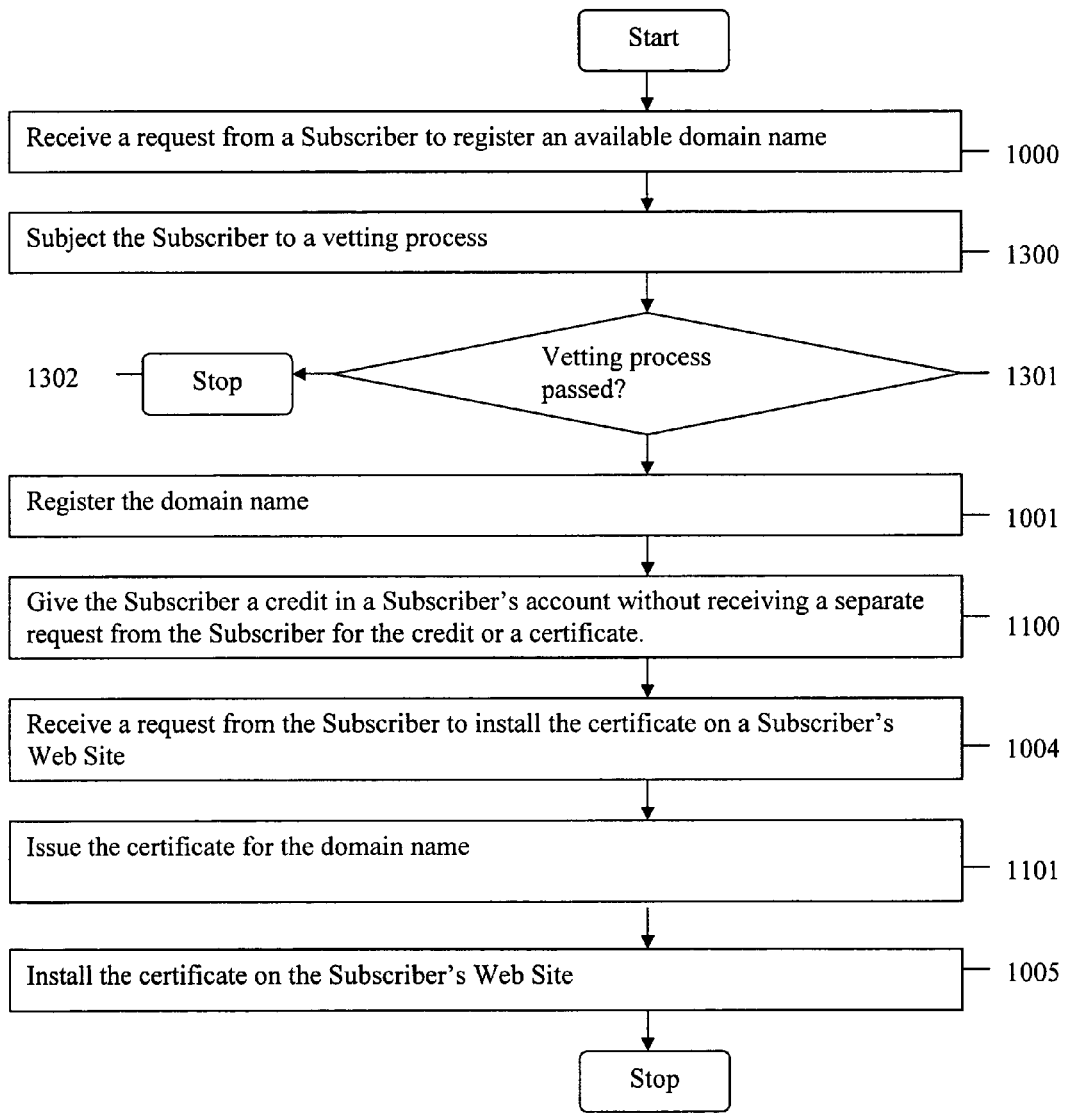
FIG. 14 is a flow chart illustrating an exemplary method of issuing and installing a certificate by vetting a Subscriber and then giving a credit to the Subscriber for a certificate.

FIG. 14 illustrates another embodiment of the invention to efficiently issue and install a certificate on a Subscriber's Web Site 180. This embodiment is similar to the embodiment illustrated in FIG. 13, except that a credit is given for a certificate after the Subscriber 150 passes the vetting process without receiving an additional request from the Subscriber 150 for the credit or the certificate (Step 1100). This embodiment combines the advantages of using a single vetting process to obtain the domain name and the certificate with the advantages of only saving the credit until the certificate is actually needed.

Figure 15:
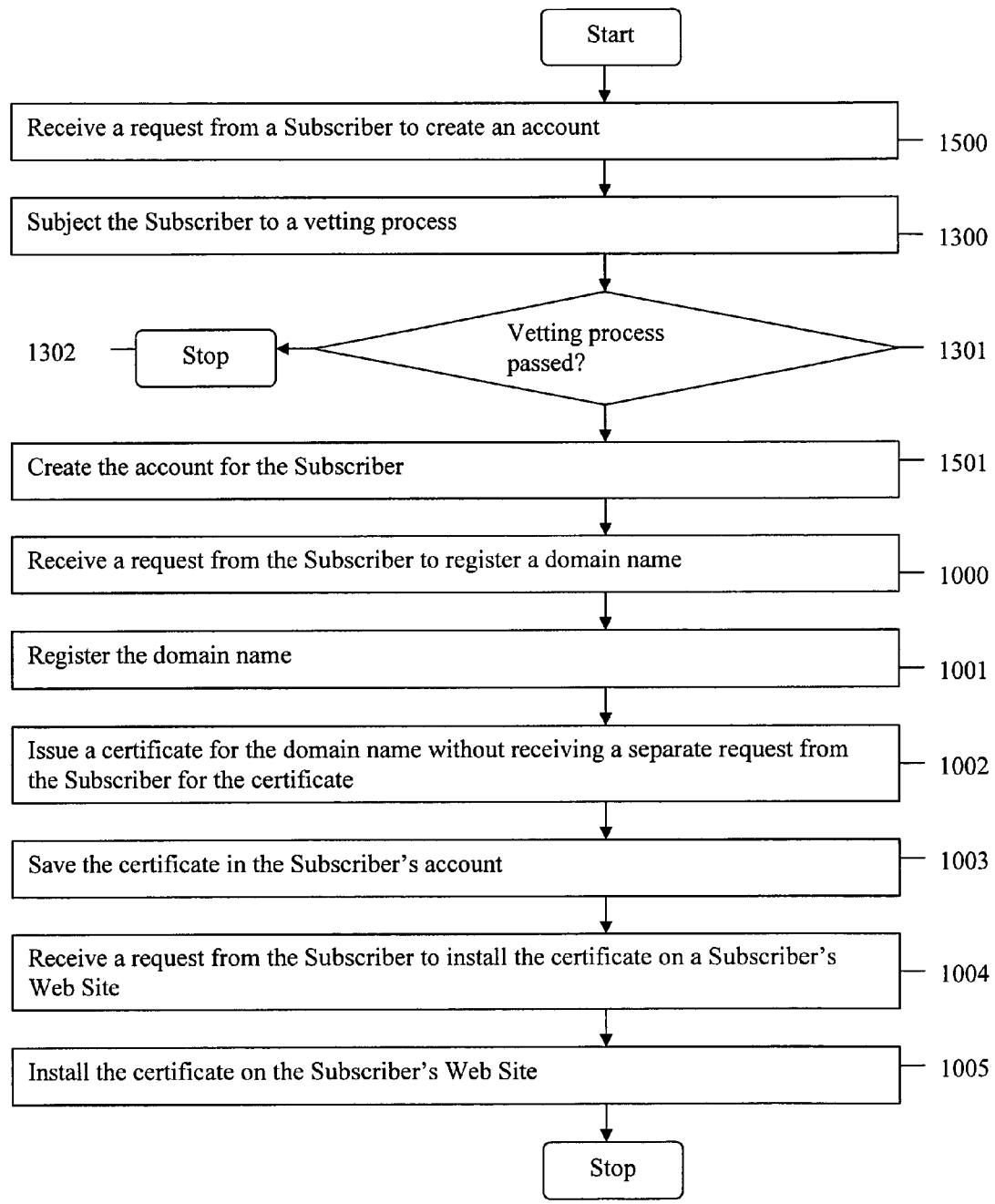
FIG. 15 is a flow chart illustrating an exemplary method of issuing and installing a certificate from a Subscriber's account after vetting the Subscriber.

FIG. 15 illustrates another embodiment of the invention to efficiently issue and install a certificate on a Subscriber's Web Site 180. This embodiment is similar to the embodiment illustrated in FIG. 13, except that the Subscriber 150 requests to create an account (Step 1500). In this embodiment, a single vetting process may be used to verify the information used to create an account, register a domain name and obtain a certificate. After passing the vetting process, a Subscriber's account may be created (Step 1501). This embodiment then allows the Subscriber 150 to log onto the Subscriber's account and register any number of additional domain names and obtain any number of additional certificates without be subjected to further vetting processes.

Figure 16:
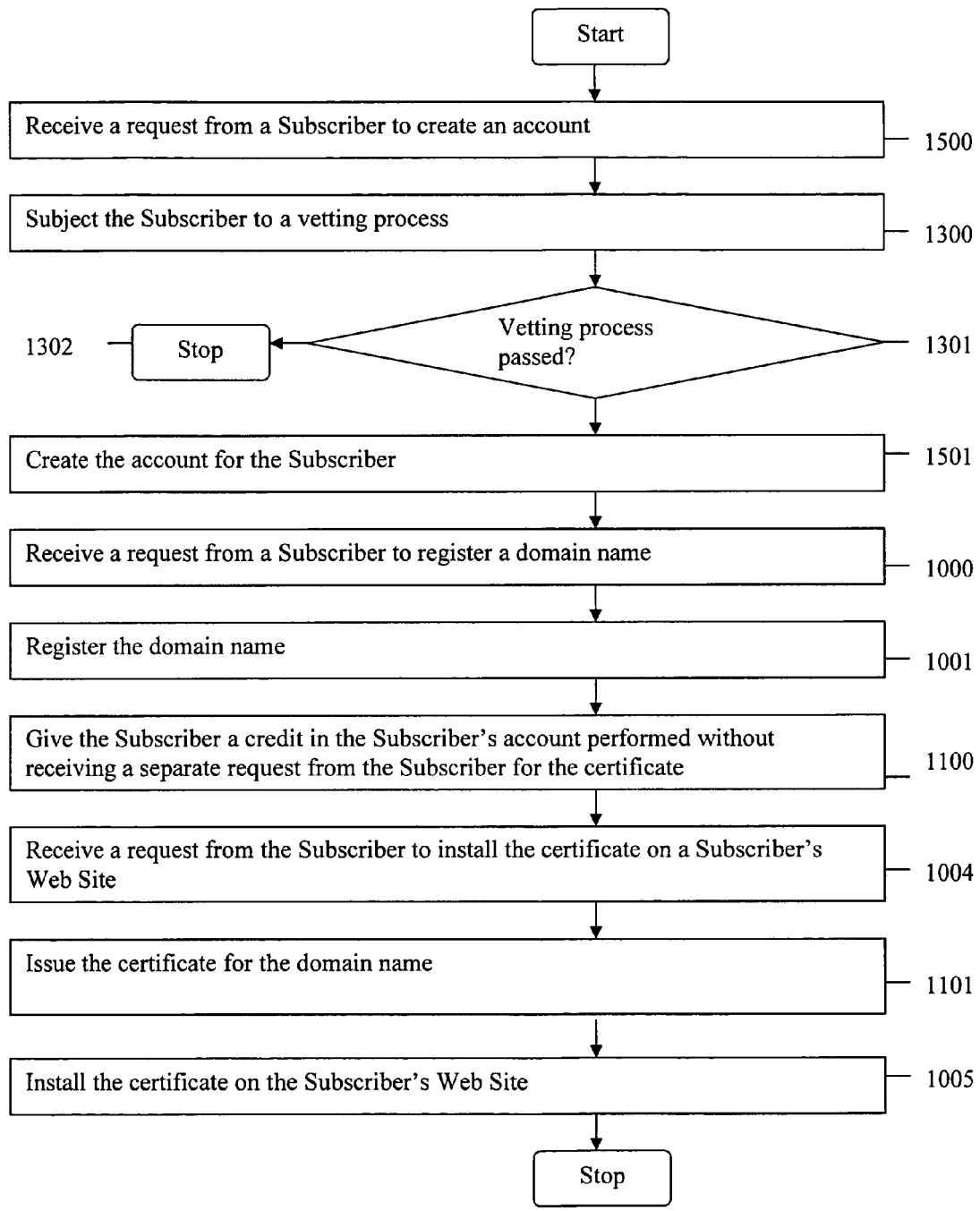
FIG. 16 is a flow chart illustrating an exemplary method of issuing and installing a certificate from a Subscriber's account after vetting the Subscriber by first giving a credit to a Subscriber for the certificate.

FIG. 16 illustrates another embodiment of the invention to efficiently issue and install a certificate on a Subscriber's Web Site 180. This embodiment is similar to the embodiment illustrated in FIG. 15, except a credit for a certificate is saved in a Subscriber's account without receiving a separate request from the Subscriber for the credit or the certificate. This embodiment combines the advantages illustrated in FIG. 15 (single vetting process) with the advantages previously discussed regarding using credits (fewer certificates needed to be issued and saved).

In view of the foregoing, it will be understood by those skilled in the art that the systems and processes of the present invention can facilitate a secure communication protocol for a Subscriber's Web Site. The above-described embodiments have been provided by way of example, and the present invention is not limited to these examples. For example, while the SSL protocol was disclosed in some detail, other encryption protocols (presently known or developed in the future) may also be used with the present invention. It should be noted that the present invention can easily be extended to a plurality of Subscribers.

Multiple variations and modification to the disclosed embodiments will occur, to the extent not mutually exclusive, to those skilled in the art upon consideration of the foregoing description. For example, not all steps are required to be performed in the order disclosed and in fact some steps may be skipped altogether in certain embodiments of the invention. Such variations and modifications, however, fall well within the scope of the present invention as set forth in the following claims.

What is claimed is:

1. A method, comprising the steps of:
   a) receiving a request, via one or more input fields displayed to a subscriber via one or more software functions executed on one or more computer resources shared by one or more coordinated business entities, create an account for the subscriber;
   b) receiving a selection for the subscriber to receive a credit in the account for a security certificate configured to verify, by a trusted third party recognized by a browser, the subscriber or a subscriber website;
   c) responsive to the subscriber affirmatively acknowledging wanting the security certificate, sending a certificate signing request for the security certificate, comprising a public key and a distinguished name for the subscriber or the subscriber website, to a certificate authority software function executed on the one or more computer resources, d) receiving the security certificate, signed and issued, from the certificate authority software function;
e) installing and configuring the security certificate on the subscriber website, via direct communication between the certificate authority software function and a hosting software function executed on the one or more computer resources.

2. The method of claim 1, wherein the request from the subscriber to create the account includes displaying to the subscriber that, responsive to the subscriber registering one or more domain names, the subscriber will receive the credit or the secure certificate.

3. The method of claim 1, wherein the request from the subscriber to create the account does not include a request for the credit or the secure certificate.

4. The method of claim 1, further comprising the steps of:
receiving a request from the subscriber to install the certificate on the subscriber website;
issuing the certificate for one or more domain names registered to the subscriber; and
installing the certificate on the subscriber website.

5. The method of claim 1, further comprising the steps of:
receiving registration information from the subscriber to register one or more domain names; and
using the registration information to issue the security certificate.

6. A method, comprising the steps of:
a) receiving, from one or more web pages within a facilitator website hosted on the one or more server computers within a facilitator computer network, a request to register one or more domain names via one or more domain name registration software functions hosted on the one or more server computers, wherein the request comprises registration information for a subscriber;
b) registering the one or more domain names;
c) displaying to the subscriber on the facilitator website a notification that, responsive to the subscriber registering the one or more domain names, the subscriber will obtain a security certificate configured to verify, by a trusted third party recognized by a browser, the subscriber or a subscriber website for the domain name, without receiving a separate request from the subscriber for the security certificate;
d) receiving a request from the subscriber to obtain the security certificate;
e) sending a certificate signing request for the security certificate, comprising a public key and a unique distinguished name for the subscriber or the subscriber website, to a certificate authority software function hosted on the one or more server computers;
f) receiving the security certificate, signed and issued, from the certificate authority software function; and
g) installing and configuring the security certificate on the subscriber website, via direct communication between the certificate authority software function and a hosting software function on the one or more server computers.

7. The method of claim 6, wherein the security certificate is not received, signed or issued until after a hosting account for the subscriber website is created.

8. The method of claim 6, wherein the request from the subscriber to register the one or more domain names includes a request for the security certificate.

9. The method of claim 6, wherein the request from the subscriber to register the one or more domain names does not include a request for the security certificate.

10. The method of claim 6, further comprising the step of saving the security certificate in an account for the subscriber so that the security certificate may be subsequently installed on the subscriber website.

11. The method of claim 6, further comprising the steps of:
receiving a request from the subscriber to install the security certificate for the subscriber website; and
installing the certificate for the Subscriber's Web site.

12. The method of claim 6, further comprising the steps of:
receiving registration information, comprising contact information for a subscriber received via one or more input fields on the one or more web pages, from the subscriber to register the one or more domain names; and
using the registration information to issue the security certificate.

13. A method, comprising the steps of:
a) receiving, from one or more web pages within a facilitator website hosted on the one or more server computers within a facilitator computer network, a request to create an account and to register one or more domain names via one or more domain name registration software functions hosted on the one or more server computers, wherein the request comprises registration information for a subscriber;
b) subjecting the subscriber to a vetting process comprising verifying, using the registration information, the identity and reputation of trustworthiness of the subscriber, wherein responsive to the subscriber passing the vetting process, the subscriber passes all subsequent vetting processes;
c) registering the domain name responsive to the subscriber passing the vetting process;
d) receiving from the subscriber a selection of a credit for a secure certificate in the account without receiving a separate request from the subscriber for the security certificate;
e) sending a certificate signing request for the security certificate, comprising a public key and a unique distinguished name for the subscriber or the subscriber website, to a certificate authority software function hosted on the one or more server computers;
f) receiving the security certificate, signed and issued, from the certificate authority software function; and
g) installing and configuring the security certificate on the subscriber website, via direct communication between the certificate authority software function and a hosting software function on the one or more server computers.

14. The method of claim 13, wherein the request from the subscriber to register the one or more domain names includes a request for the security certificate.

15. The method of claim 13, wherein the request from the subscriber to register the one or more domain names does not include a request for the security certificate.

16. The method of claim 13, further comprising the steps of:
receiving a request from the subscriber to install the security certificate on the subscriber website;
issuing the certificate for the one or more domain names; and
installing the certificate on the subscriber website.

17. The method of claim 16, further comprising the steps of:
receiving the registration information from the subscriber to register the one or more domain names; and
using the registration information to issue the security certificate.

18. A method comprising the steps of:
a) receiving, from one or more web pages within a facilitator website hosted on the one or more server computers within a facilitator computer network, a request to create an account via one or more software functions hosted on the one or more server computers, wherein the request comprises registration information for a subscriber;
b) subjecting the Subscriber to a vetting process comprising verifying, using the registration information, the identity and reputation of trustworthiness of the subscriber, wherein responsive to the subscriber passing the vetting process, the subscriber passes all subsequent vetting processes;
c) creating the account responsive to the subscriber passing the vetting process;
d) receiving a request from the subscriber to register a domain name;
e) registering the domain name; and
f) giving the subscriber a credit for a security certificate configured to verify, by a trusted third party recognized by a browser, the subscriber or a subscriber website in the account without receiving a separate request from the subscriber for the credit or the security certificate, wherein the security certificate is subsequently requested, signed, installed and configured on the subscriber website.

19. The method of claim 18, wherein the request from the subscriber to register the domain name includes a request for the security certificate.

20. The method of claim 18, wherein the request from the subscriber to register the domain name does not include a request for the security certificate.

21. The method of claim 18, further comprising the steps of:
receiving a request from the subscriber to install the security certificate on the subscriber website;
issuing the security certificate for the domain name; and
installing the security certificate on the subscriber website.

22. The method of claim 21, further comprising the steps of:
receiving the registration information from the subscriber to register the domain name; and
using the registration information to issue the security certificate.

* * * * *

UNITED STATES PATENT AND TRADEMARK OFFICE
CERTIFICATE OF CORRECTION

| | | |
|---|---|---|
| PATENT NO. | : 8,103,761 B2 | Page 1 of 1 |
| APPLICATION NO. | : 11/376457 | |
| DATED | : January 24, 2012 | |
| INVENTOR(S) | : Warren Adelman et al. | |

It is certified that error appears in the above-identified patent and that said Letters Patent is hereby corrected as shown below:

On the title page item (73), Assignee reading "Go Daddy Holding Company, LLC" should be changed to --Go Daddy Operating Company, LLC--.

Signed and Sealed this
Twenty-fifth Day of September, 2012

David J. Kappos
*Director of the United States Patent and Trademark Office*